COMPONENT MOUNTING MACHINES

Filed Feb. 3, 1958 17 Sheets-Sheet 1

Inventors
George F.C. Burke
Waldo B. Hanson
C Walton Musser
By their Attorney
Thomas J. Ryan Aug. 29, 1961 G. F. C. BURKE ET AL 2,998,160

COMPONENT MOUNTING MACHINES

Filed Feb. 3, 1958 17 Sheets-Sheet 5

COMPONENT MOUNTING MACHINES

Filed Feb. 3, 1958 17 Sheets-Sheet 8

Aug. 29, 1961 G. F. C. BURKE ET AL 2,998,160

COMPONENT MOUNTING MACHINES

Filed Feb. 3, 1958 17 Sheets-Sheet 10

Aug. 29, 1961 G. F. C. BURKE ET AL 2,998,160

COMPONENT MOUNTING MACHINES

Filed Feb. 3, 1958 17 Sheets-Sheet 11

Aug. 29, 1961 G. F. C. BURKE ET AL 2,998,160

COMPONENT MOUNTING MACHINES

Filed Feb. 3, 1958 17 Sheets-Sheet 12

Aug. 29, 1961 G. F. C. BURKE ET AL 2,998,160

COMPONENT MOUNTING MACHINES

Filed Feb. 3, 1958 17 Sheets-Sheet 16

United States Patent Office 2,998,160

Patented Aug. 29, 1961

2,998,160

COMPONENT MOUNTING MACHINES

George F. C. Burke, Beverly, Waldo B. Hanson, Malden, and C Walton Musser, Beverly, Mass., assignors to United Shoe Machinery Corporation, Flemington, N.J., a corporation of New Jersey Filed Feb. 3, 1958, Ser. No. 712,816
7 Claims. (Cl. 221—159)

This invention relates to machines for mounting work pieces such as electrical components or the like, and it more especially pertains to machines for inserting and clinching terminal projections such as leads extending in generally radial or parallel relation from their component or other bodies. It will be understood that although the invention is herein illustrated as applied to a machine for installing disc-type capacitors, commonly and hereinafter referred to as "discaps," it is in various aspects not restricted to machines of this type and may well have application to machines for dealing with other components, both electronic and otherwise, particularly when they are of non-uniform shape.

When, as in the case of mounting components on wiring boards, successive articles must be precisely positioned by mechanical means and at least some of the articles are of irregular configuration, the problem of designing reliable yet rapidly operating machines consistently to do the job becomes difficult. It is found, for instance, that the discap inserting machine disclosed in an application filed January 27, 1956, Serial No. 561,812, in the name of John E. Walsh, now United States Letters Patent No. 2,850,737, granted September 9, 1958, is quite satisfactory for mounting discap leads in wiring board holes affording only a few thousandths of an inch clearance provided that the bodies of the components are held to small dimensional tolerances, but that it is not apt to be sufficiently effective for purposes of automatic production when dealing with discaps normally available from regular commercial sources at considerably lower cost and having greater tolerances. That jams in feeding and inaccurate positioning due to dimensional irregularities in the articles themselves can be avoided by the use of regularly shaped containers for controlling the individual articles is disclosed in a copending application Serial No. 712,821, filed February 3, 1958, in the name of Albert E. Newton, now U.S. Letters Pattent No. 2,869,130, granted January 20, 1959. His illustrative machine also embodies, incidentally, article transferring means resembling in some ways that incorporated herein and in other ways resembles component feeding means previously disclosed in a copending application Serial No. 525,330, filed July 29, 1955, in the name of Milton H. Roske, now United States Letters Patent No. 2,855,113, granted October 7, 1958.

The primary object of the present invention is to provide improved, highly dependable apparatus for feeding and mounting components or the like, which apparatus, despite irregular configuration and dimensional tolerance of the components, will be of simple construction and effective to make numerous installations rapidly and automatically with a minimum of operator attention.

Pursuant to the object just stated, and in accordance with a feature of the invention, there is conveniently provided in a unitary component-mounting machine cyclically operable means for inserting components, a plurality of individual component carriers, hopper means for segregating and positioning successive components in the carriers to be fed to the inserting means, delivery and return tubes for guiding successive carriers between the hopper means and the inserting means, and fluid pressure means operable after a component is delivered to the inserting means to return an empty carrier to the hopper means for reloading. By reason of advantageous features afforded by this organization and its associated automatic controls to be described, after an operator provides the machine with a supply of components en masse, it positively, yet delicately assumes continuous control of successive components to insure their feeding and precise positioning right to the zone of lead insertion.

The above and other features of the invention, including various novel details of construction and arrangements of parts, will now be more fully described in connection with an illustrative machine and with reference to the accompanying drawings thereof, in which.

Figure 1:
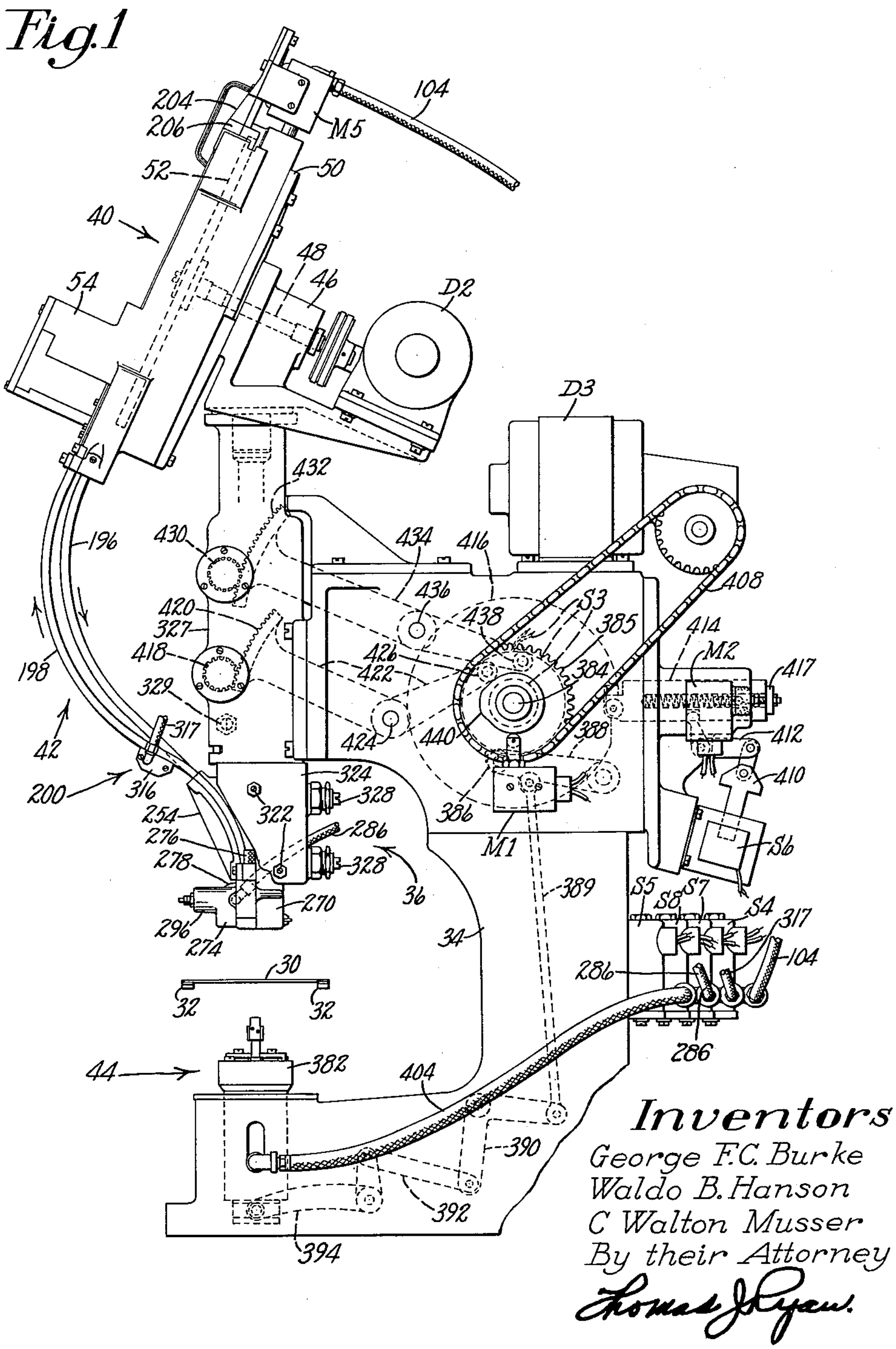
FIG. 1 is a view in side elevation of the illustrative machine as adapted for mounting in a conveyorized assembly line.

Although the description to follow is, for reading convenience, arranged under several sub-titles, it will be understood that the subject-matter as a whole is directed to the provision of unitary apparatus for attaining more reliability and better accuracy in mounting components which are themselves not always of uniform dimensions. It will be understood that the machine illustrative of the invention may be adapted for operation as a single machine or, as herein shown, it may be mounted in a conveyorized assembly line and adapted to be automatically controlled by a conveyor system such as that disclosed, for instance, in United States Letters Patent No. 2,772,416, granted December 4, 1956 upon an application of Adolph S. Dorosz and Thomas W. Snow. (The conveyorized assembly system is disclosed in electrical series arrangement in said patent and disclosed in parallel form in a copending application Serial No. 545,765, filed Nov. 8, 1955 in the names of Harold W. Bishop and Basil A. Strout, now United States Letters Patent No. 2,877,541, granted March 17, 1959.)

In this production-line arrangement successive printed wiring boards 30 (FIGS. 1 and 21) or the like, which are to receive endwise the leads L of each component C to be mounted, are carried on spaced, parallel, endless belts 32, 32 (FIG. 1) to each assembly station, and means, not herein shown, positions each wiring board with respect to an inserting or other processing machine for the reception of a component or other treatment. The illustrative machine for inserting discaps comprises a main hollow C-frame 34 (FIG. 1) adjustably mounted at one conveyor station, an inserting head 36 rotatably mounted on the upper front portion of the frame 34, a plurality of carriers 38 (FIGS. 11–13, 16 and 19) for holding individual discaps, a carrier loading mechanism generally designated 40 (FIG. 1) positioned above the head 36, fluid-pressure-operated means generally designated 42 for successively delivering loaded carriers to the head 36 and returning empty carriers to the loading mechanism, mechanism generally designated 44 in the lower portion of the frame for clinching the leads of inserted components, and electrical means for controlling the operative cycle of the machine.

Before proceeding with a detailed description of the illustrated machine, the configuration peculiar to discaps should be noted. Unless special and relatively costly precautions are taken in their manufacture, the fairly smooth, circular bodies of commercially available discaps are normally of non-uniform contour. In cross section they are generally elliptical but their thickness may differ and irregularity in shape may be found frequently, for example where the leads protrude from the bodies. Also, the leads are often irregularly bent and they are usually offset to project on opposite sides of the plane containing the axes of the body. It will thus be apparent that to insert without fail the leads of such discaps and other jam inducing components endwise into holes affording but a few thousandths of an inch clearance, when their bodies by which the components must be controlled may have their greatest dimension range from less than three-eighths of an inch to about three-fourths of an inch, becomes a difficult mechanical feat.

*Carrier loading mechanism*

Referring to FIGS. 1 to 4, mounted at the top of the machine is a bearing bracket 46 (FIG. 1) for receiving an inclined rotary shaft 48. This shaft extends through the hub of a three-armed casting 50 secured to the bracket 46 and has affixed to its upper end a circular separator-positioning plate 52 somewhat similar to that shown in said Roske application. Accordingly, the plate 52 constitutes an inclined rotatable bottom of a cylindrical hopper 54 the lower portion of which protrudes to hold in random fashion a plurality of discaps to be successively mounted by the machine. For causing a series of formed pockets 56 in the plate 52 successively to pass (clockwise as viewed in FIG. 2) through the mass of components and then separate and uniformly position individual components leads-foremost, the lower end of the shaft 48 is coupled to the reduction gearing of a motor D–2 (FIGS. 1 and 24) mounted on the bracket 46. The motor D–2 is connected into an electrical control system associated with the conveyor as subsequently described.

Figure 2:
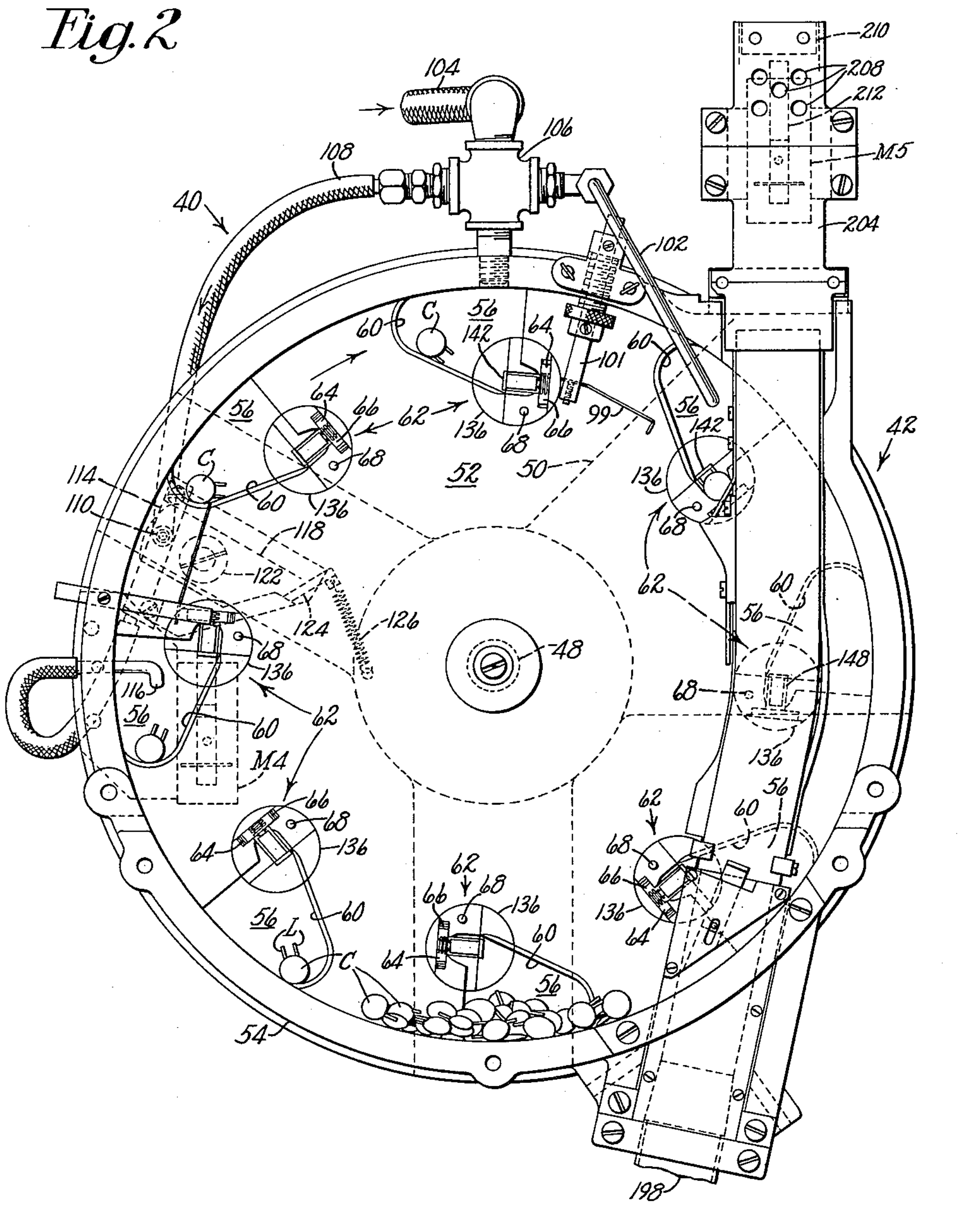
FIG. 2 is a view of hopper means shown in FIG. 1 for separating components and automatically loading them into carriers, the view being taken parallel to the axis of rotation and a part of the hopper and carrier transporting means being removed.
Figure 8:
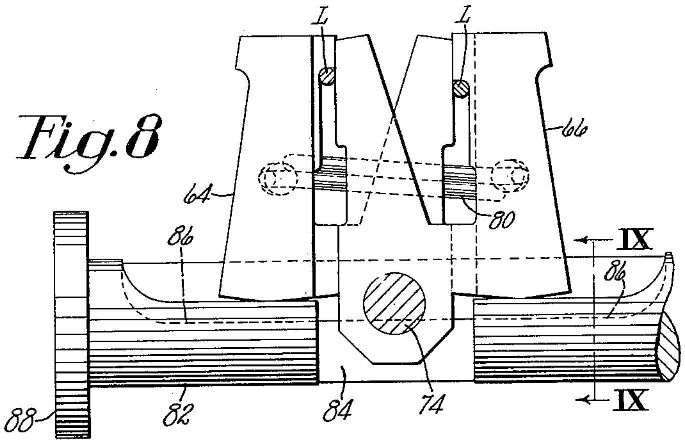
FIG. 8 is an enlarged detail view showing the lead gripping jaws of FIG. 7 closed upon the leads of a discap.
Figure 9:
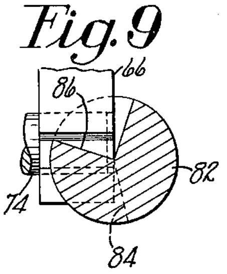
FIG. 9 is a section taken on the line IX—IX of FIG. 8.

The outline of the pockets 56 preferably differs slightly from that shown in the Roske application cited above in that in the present case an inner edge 60 of each pocket is adapted to guide a component somewhat inwardly from the plate periphery to a lead-straightening and transfer station generally designated 62 (FIGS. 2, 3, 5, 7 and 13). As indicated in FIG. 2, on leaving the 12 o'clock position on the plate 52 a segregated discap will usually slidably descend in the station 62 on an edge 60, simultaneously revolving thereon, if possible, until its leads are foremost. The construction of the stations 62 being identical, it will suffice to describe one of them and its operation. As herein shown (FIGS. 5–7), each station includes a pair of dual-acting, lead-gripping jaws 64, 66, a carrier detector and transfer pin 68 which cooperates with a slot 70 in the carrier 38 being loaded by the station 62, jaw actuating means to be described, and elevator mechanism for effecting transfer of a segregated component after lead-straightening into the carrier 38. The latter is brought into appropriate discap receiving position by the fluid-pressure-operated carrier feeding means 42 hereinafter to be described. For pivotally supporting the jaws 64, 66, each of which is provided with spaced sets of lead-engaging leaves 72 that are disposed to be interdigitated on closure of the jaws, a pin 74 extends in a bore formed in an irregularly shaped block 76 (FIG. 7), the latter being secured by a pair of screws 78 (FIGS. 5 and 6) to the underside of the plate 52. The jaws tend to be held open by a torsion spring 80 lying in a recess in the plate 52, but are actuated by means next to be explained. A jaw-closing shaft 82 (FIGS. 5–9), rotatable in a bore formed in the block 76, is provided with a radial clearance cut 84 centrally as indicated in FIGS. 8 and 9, and also formed with an axially extending radial shoulder 86 that is disposed to bear upwardly, during clockwise movement (as viewed in FIG. 9) of the shaft, on under portions of the jaws 64, 66. The jaws are thus swung toward each other to grip the leads and accordingly hold and tend to straighten them in their appropriately spaced positions. One end of the shaft 82 is formed with a retaining head 88 and the other end is secured by setscrews to an operating arm 90 (FIGS. 5 and 6) extending in advance of its station and carrying a follower 92. The latter is disposed to engage a stationary jaw-controlling cam 94 (FIGS. 3 and 4) mounted on a plate 96 which is secured to the casting 50. A compression spring 98 (FIGS. 5 and 6), having one end seated in the plate 52 and its other end seated in the arm 90, is stronger than the spring 80 and hence tends normally to hold the jaws closed. The rise of the cam 94 acts to open the jaws 64, 66 from about 1 to 2 o'clock, or until a pair of leads will have been received, and the jaws are then permitted to be closed by the spring 98 to effect straightening. In order to release the leads for the interval of carrier loading normally occurring in the 3 to 3:30 o'clock position, as will be described, a cam 100 (FIGS. 3 and 4) having a rise, a flat, and a downward slope, in clockwise order, is mounted on the plate 96 and disposed to be engaged by the follower 92. The downward slope of the cam 100 is disposed to allow the jaws 64, 66, under the influence of the spring 98, to regain their grip on the leads if for some reason no carrier 38 was in position to receive the component and accordingly that component will be retained in its pocket 56 and recirculated without being subjected to further tumbling action.

Figure 3:
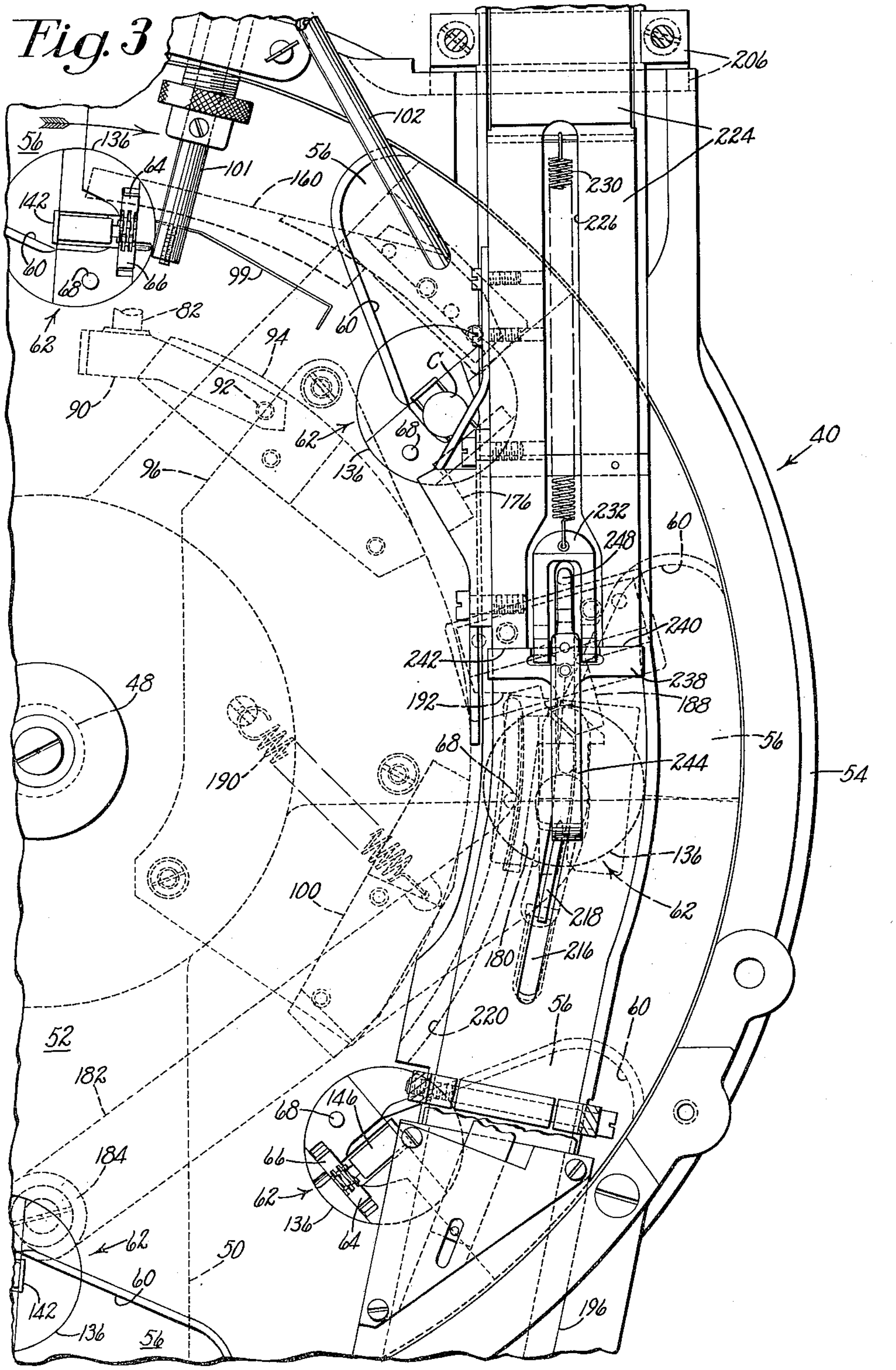
FIG. 3 is an enlarged view of a portion of the carrier loading means shown in FIG. 2.
Figure 4:
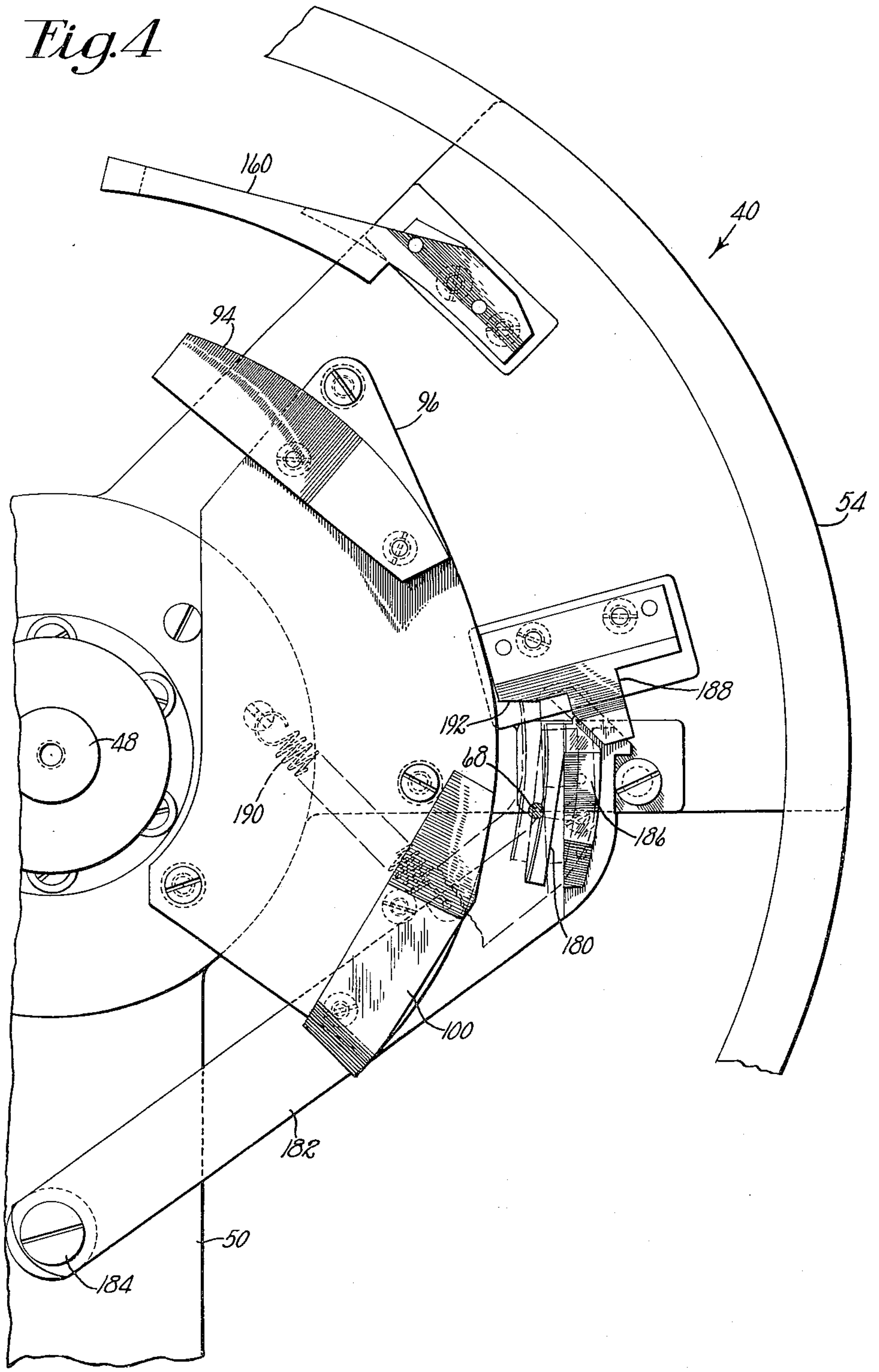
FIG. 4 is a view similar to FIG. 3 but with carrier-guiding tubes and a component separator-positioner-plate removed to reveal cam operated mechanism.

Occasionally more than one discap may be in the pocket 56 and advance toward a station 62 as the latter approaches its operating zone. For returning to the hopper 54 any discap protruding from the pocket 56, a claw 99 in the form of a bent wire is adjustably disposed to extend from a stud 101 threaded into the rim of the hopper as shown in FIG. 3. To avoid possible interference with carrier loading from any extra discap passing the claw 99, a jet of air is directed via a tube 102 (FIGS. 2 and 3) toward the stations 62 approximately as they leave their 2 o'clock position so that a correctly positioned discap will continue to be gripped by the jaws 64, 66, but the extra, if any, will be ejected for return to the hopper 54. For intermittently timing blasts from the tube 102 an ejector air blast switch M–4 (FIGS. 2 and 24) is mechanically operated to open and close during rotation of the plate 52 alternately to energize and deenergize a solenoid valve S–4 controlling admission of air to a hose 104 (FIGS. 1 and 2). A fitting 106 (FIG. 2) secured to the hopper 54 receives the air from the hose 104 for delivery into the tube 102 and is also connected to a hose 108 (FIGS. 2 and 14) for a similar purpose about to be explained.

Figure 14:
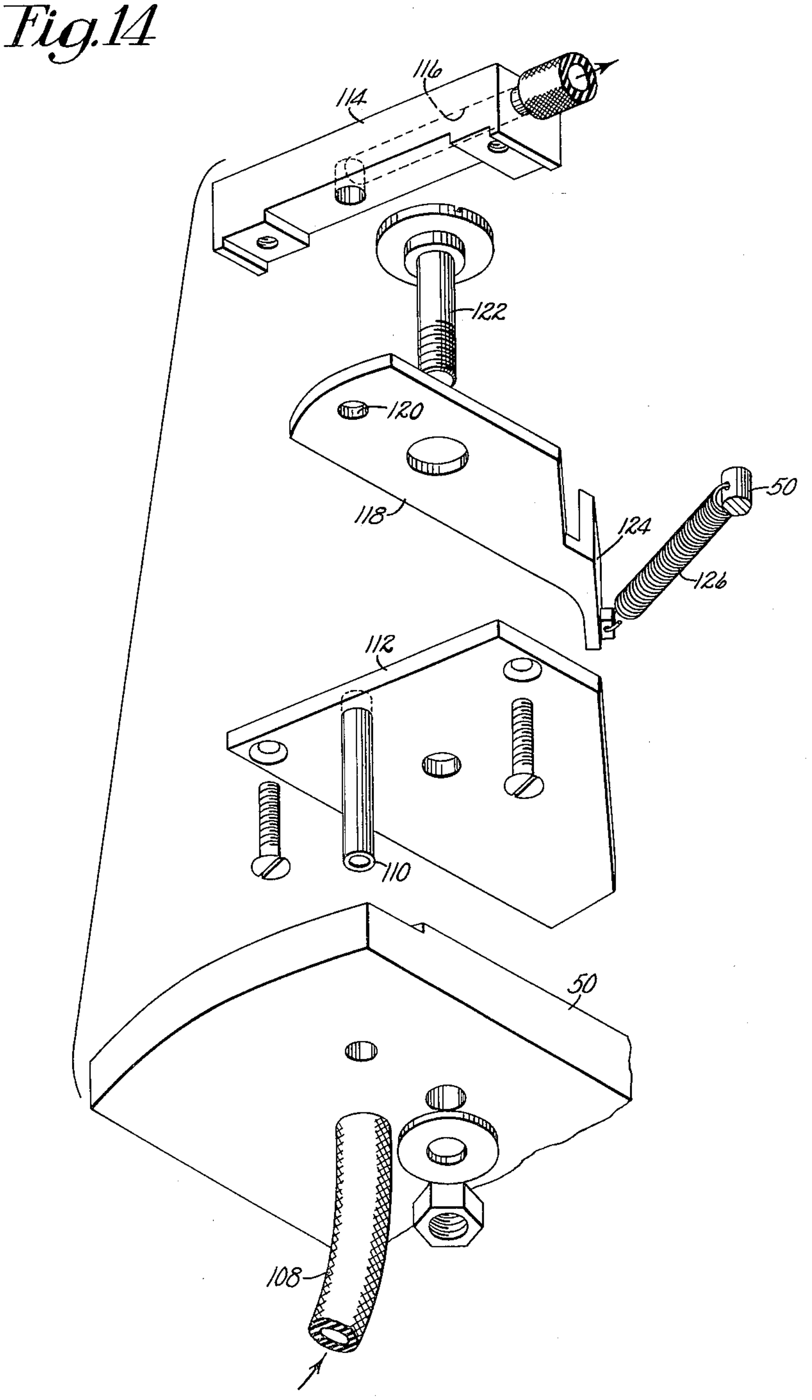
FIG. 14 is an exploded perspective view of an air ejector valve shown at the left of FIG. 2.

Air from the hose 108 is normally directed to successive separator pockets 56 as they leave their 8 o'clock position, approximately, to force surplus discaps in excess of a recirculating one which may be held by the jaws 64, 66 to be urged off a rising pocket edge 60. If no discap is thus being recirculated, it is essential that air from the hose 108 be shut off to allow the pockets 56 to retain picked-up discaps and function in their normal manner. Accordingly, control valve mechanism shown in FIG. 14 is provided in the line of the hose 108 and comprises a conduit 110 extending through the casting 50 and in communication with the hose 108. This conduit extends through a flat spacer plate 112 secured to a somewhat U-shaped block 114 formed with an outlet bore 116. A cut-off lever 118 is provided with an opening 120 near one end thereof and pivotally mounted on a stud 122 extending through the plate 112 and through the casting 50. The arrangement is such that air may only flow from the conduit through the opening 120 and into the bore 116 when a discap is being recirculated, but air flow from the conduit is normally effectually terminated by the follower 92 (in the absence of a captured discap) being disposed to engage and displace an upturned cam portion 124 formed on the cut-off lever 118, the latter then blocking the conduit 110 until a return spring 126 connecting the lever 118 and the casting 50 is permitted to operate.

Figures 5, 6:
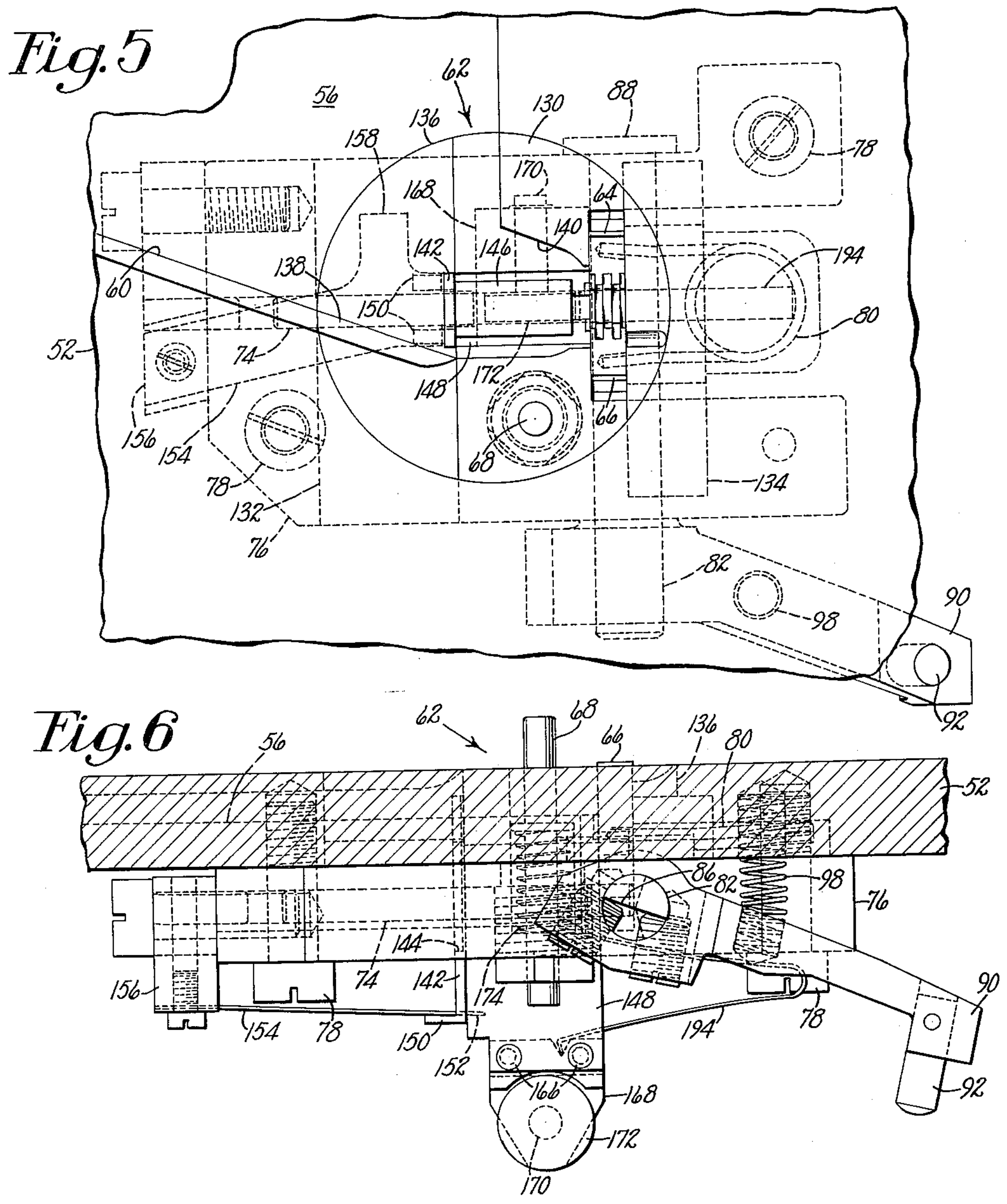
FIG. 5 is a plan view of a single component positioning station shown in FIGS. 2 and 3 and indicating lead-straightening and pallet-loading elements.
FIG. 6 is a side elevation of the parts shown in FIG. 5.

The central portion of the block 76 (FIG. 7) is formed with an upstanding cylindrical portion 130 which, together with complemental portions of adjacent blocks 132, 134, constitute a complete cylindrical insert in the plate 52 that is designated 136 in FIGS. 2, 3 and 5. The cylindrical formation is maintained by the block 76 serving to clamp base portions of the blocks 132, 134 against the underside of the plate 52. A wall 138 (FIG. 7) of the block 132 is in continuation of the edge 60 to guide a discap body into a recess 140 in the portion 130 from which transfer to a carrier will be made. If received in the recess 140, leads foremost, the leads will extend into the jaws 64, 66 but if received in the recess with the leads trailing, they will overhang the portion 130 and be in the path of a gate 142 (FIGS. 2, 3, 5–7) arranged to be reciprocated heightwise to eject the discap for return to the hopper. To permit such movement of the gate it has a rectangular opening 144 for receiving a guide block or tongue 146 formed in the block 76, and an adjacent injector 148 is also movable heightwise while being guided by the tongue 146 for a purpose and by means soon to be explained. The gate is formed with a pair of feet 150 (FIGS. 5–7) for receiving a tongued end 152 of a flat spring 154 the other end of which is screwed to a block 156 secured to the block 76. For actuating the spring 154 it is provided with an arm 158 disposed to engage a cam 160 (FIG. 4) adjacent to the casting 50. When, as is more usual, the discap leads extend foremost on arrival in the recess 140, the gate 142 merely raises and assists in retaining the discap therein. The leads then extend between the jaws (as shown in FIG. 8) and lie on horizontal leveling projections 162 (FIG. 7), respectively, of the injector 148. Upright projections 164 of the injector normally extend between the leads of a discap to cooperate with the jaws 64, 66 and are disposed to engage the lower portion of the periphery of the discap to support and position it properly for transfer into a carrier 38. The injector is mounted on parallel pins 166, 166 in a block 168, the latter providing bearings for a shaft 170 integral with a roller 172.

Figure 7:
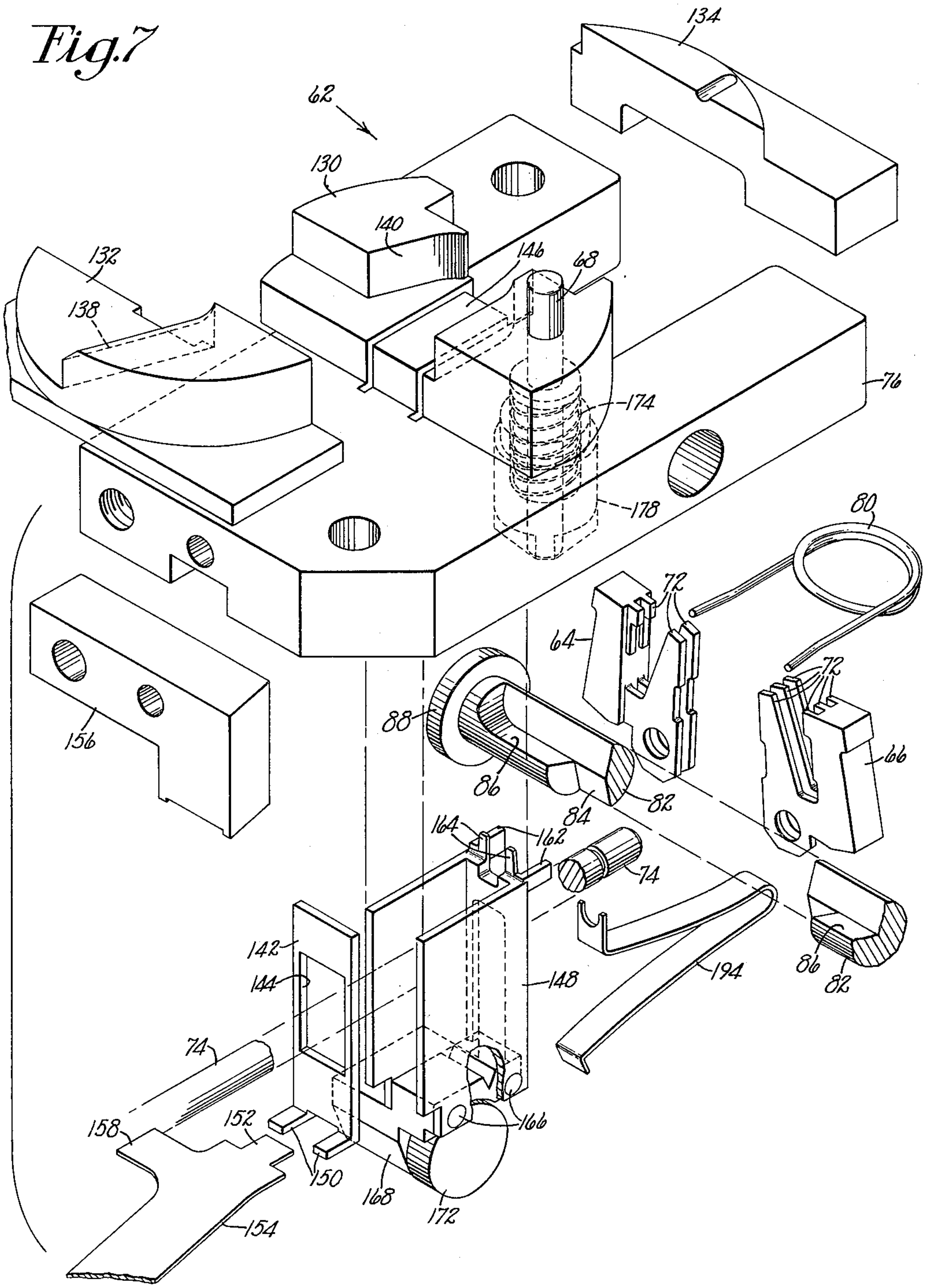
FIG. 7 is an exploded perspective view of parts shown in FIGS. 5 and 6.
Figures 11, 12, 13:
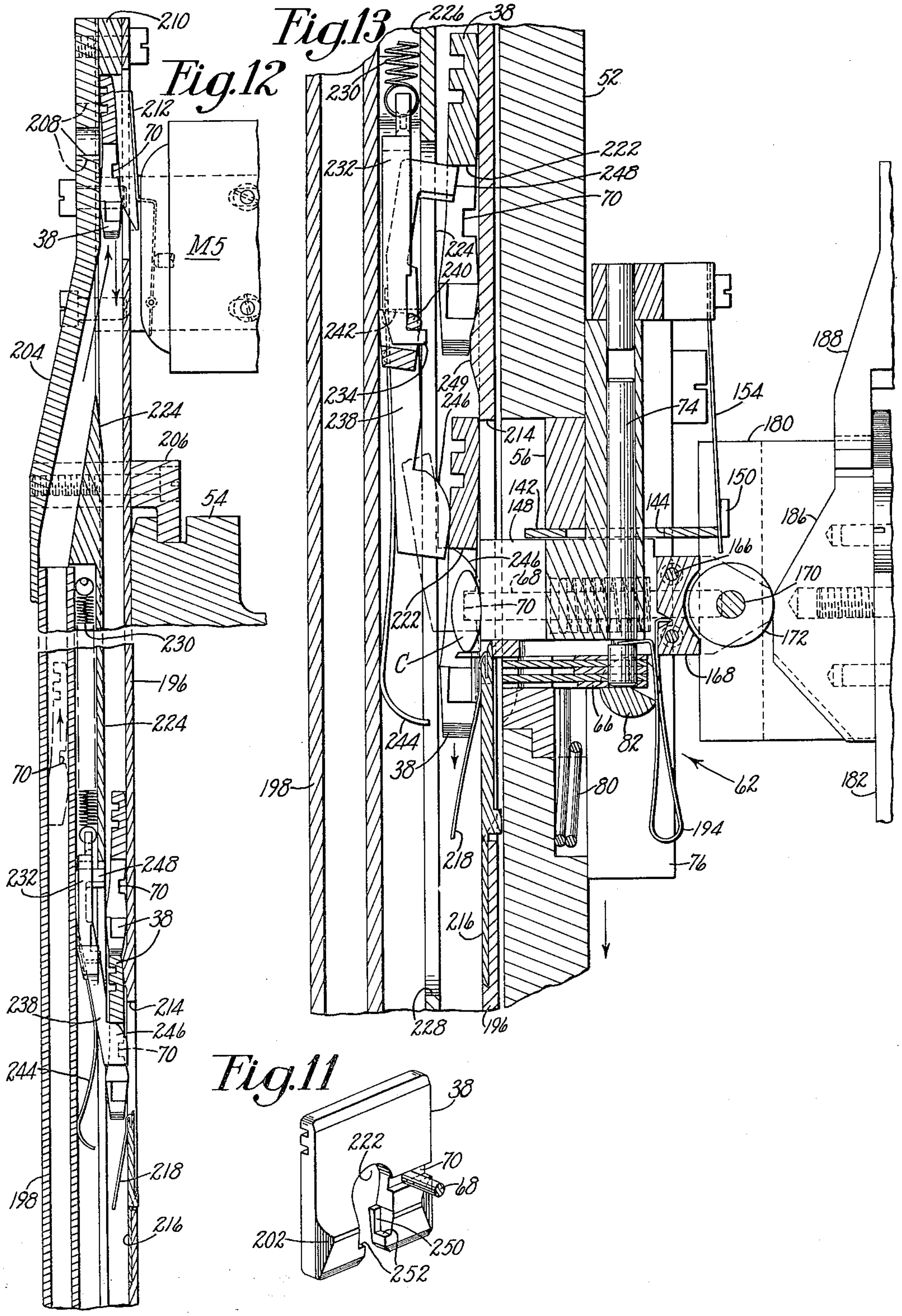
FIG. 11 is a perspective view of the component carrier and indicating its engagement with a transfer pin shown in FIGS. 5, 6 and 7.
FIG. 12 is a vertical section taken on the center line of carrier tubes shown in FIG. 2.
FIG. 13 is a view similar to FIG. 12 but enlarged and showing the parts at a later stage when a carrier is being loaded.

As has been noted the carrier loading mechanism 40 further includes in each station 62 a carrier detector and transfer pin 68 (FIGS. 7, 11 and 13). This pin extends in, and normally projects endwise from, a bore formed in the cylindrical portion 130 and in the block 76. Yieldingly to depress the pin 68 against the resistance of a compression spring 174 bearing on a shoulder thereof, as required to enable the pin 68 to come beneath a carrier about to be loaded and thereafter register with its slot 70 (FIG. 11), a cam 176 (FIG. 3) is secured above the carrier loading zone to the aforementioned carrier transporting means 42 about to be described. The spring 174 is seated in a retainer 178 (FIG. 7) threaded into the block 76. If no carrier has arrived in position to be loaded, the detector and transfer pin 68 will be allowed to be moved by the spring 174 endwise to an inoperative position above a face cam 180 (FIG. 4) secured on one end of a lever 182 the other end of which is pivoted to the casting 50 at 184. But to load a carrier, if there is a carrier 38 in position to be loaded, the pin 68 will engage the cam 180 thus to swing the lever 182 clockwise (as viewed in FIG. 4) and cause the roller 172 to engage a cam 186 (FIGS. 4 and 13) secured on the lever 182. A stationry lifter or cam 188 on the casting 50 is disposed to assist the roller 172 onto the cam 186. The clockwise movement of the lever 182 is effected against the resistance of a tension spring 190 (FIG. 4) connecting it to the casting 50 and normally holding the lever against a stop surface 192 of the cam 188. For urging the roller 172 toward cam-engaging position and to insure return or descent of the injector after loading of a carrier 38 a U-shaped leaf spring 194 (FIGS. 7 and 13) has one end semicircularly grooved to receive a reduced portion of the pin 74. The other end of the spring 194 is bent away from its grooved end and latched in a notch formed in the block 168.

*Carrier transporting means*

The means 42 for circulating the carriers 38 extends through the hopper 54 adjacent to the face of the plate 52 for cooperation therewith, and includes a delivery tube 196 and a return tube 198 (FIGS. 1, 2, 3, 12 and 13) providing, as herein shown, rectangular passageways, and pneumatic means 200 (FIG. 17) associated with the return tube 198 for lifting the empty carriers to be reloaded. The cross section of a carrier 38 at its thicker portion designated 202 is adapted nearly to fill, but not block, the passageway of either tube 196 or 198. A member 204 (FIG. 12) serves to merge the passageway of the tube 198 with the upper end of the tube 196 and is secured by a clamp 206 to the hopper 54. The upper end of the member 204 is vented by holes 208 (FIGS. 2 and 12) and supports an end or stop block 210 which is engaged by each upwardly returned carrier 38, as shown in FIG. 12, before the latter falls by gravity into the tube 196. Affixed to the member 204 for a purpose later explained in conjunction with the electrical sequence of operations is a time delay carrier-return air control switch M5 (FIGS. 1, 12 and 24) having a spring-biased arm 212 arranged to be engaged by a carrier 38 at the limit of its upward movement to close the switch M5.

Figure 10:
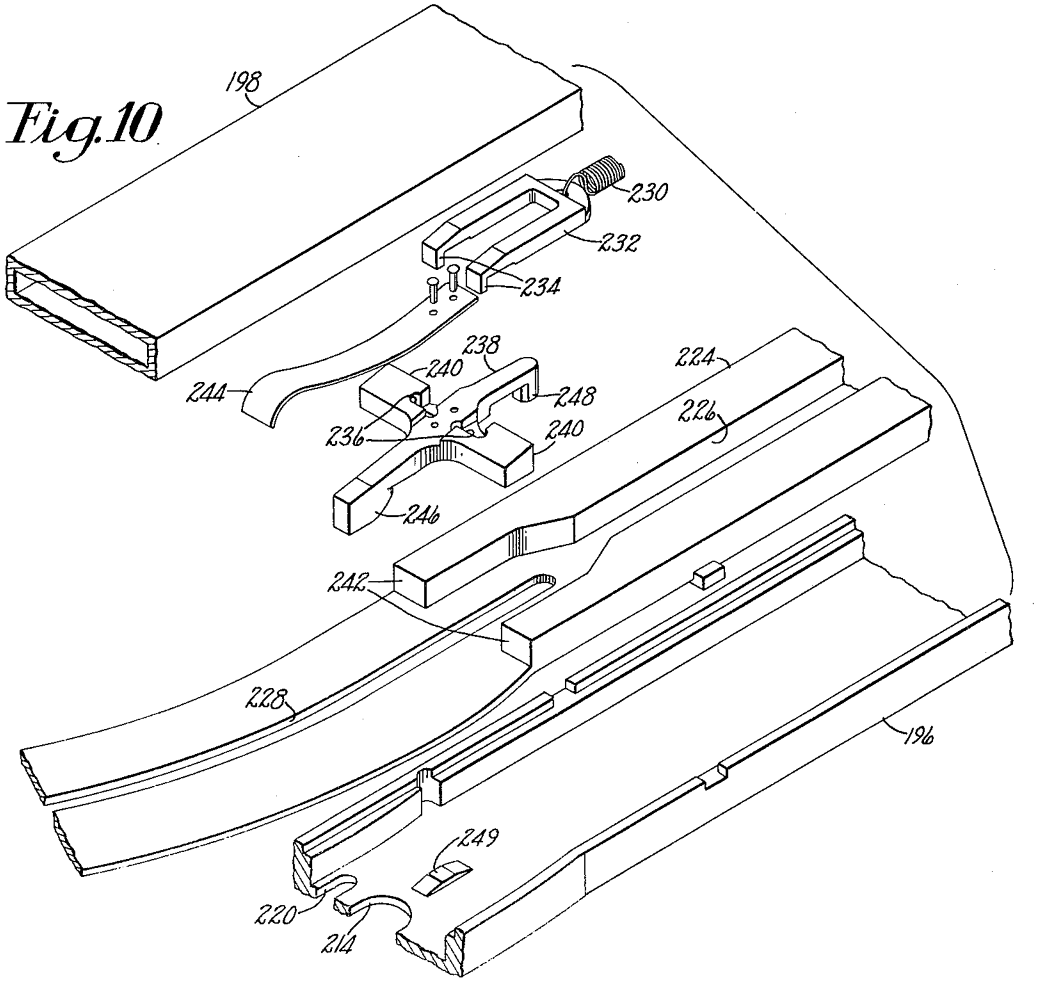
FIG. 10 is an exploded perspective view of certain of the carrier loading parts shown in FIG. 3.

The passageway of the delivery tube 196 extends in a path substantially tangential to and contiguous with the path of the stations 62 at the zone for transferring discaps therefrom. Accordingly, the tube 196 is formed with a receiving opening 214 (FIGS. 12 and 13) in that zone and further provided, for a reason later explained, with a rabbeted insert 216 extending into the opening 214 and carrying a spring finger 218 extending downwardly in the tube. A circular slot 220 (FIGS. 3 and 10) in the tube 196 extends adjacent to the opening 214 and is adapted to receive the pin 68 endwise. By means now to be explained an open U-shaped discap holding recess 222 (FIG. 11) in each carrier (as well as its pin receiving slot 70) is located in the delivery tube 196 in appropriate position for the subsequent presentation and transfer of a discap from the raised injector 148 of the station 62. For ease of construction and assembly the tube 196 includes a removable front cover 224 (FIGS. 10, 12 and 13) a thicker portion of which is formed with a central, longitudinal groove 226 having a wider lower end and a thinner portion of which is longitudinally formed with a slot 228. A loaded tension spring 230 (FIGS. 3, 10 and 13) anchored at its upper end in the groove 226 is secured at its lower end to a yoke 232. Tangs 234 (FIG. 10) formed on the latter are respectively received in slots 236 in a cross-shaped latch member 238 thus to link the member with the yoke. Shoulders 240 formed on the cross arm of the member 238 are normally held by the spring 230 against a shoulder 242 of the cover 224. A curved leaf spring 244 (FIG. 10) secured at one end to the member 238 slidably bears against the exterior of the return tube 198 normally to cause a depending latch portion 246 of the member 238 (the portion 246 riding in the slot 228) yieldingly to engage and initially position the wall of the carrier recess 222 to be loaded, as shown in phantom lines in FIG. 13. Upon elevation of the injector 148 to raise a discap from its pocket 56 for loading, the discap engages the latch portion 246 to displace it from the loaded carrier 38 and simultaneously a trailing angular detent portion 248 of the member 238 is caused pivotally to be depressed into the slot 228 and into a carrier recess 222 to prevent release and discharge of one or more stacked carriers, if any, waiting to be loaded thereafter by oncoming stations 62. The arrangement is such that if, perchance, no discap has been positioned in a pocket 56 passing the loading zone, the transfer stroke of the injector 148 will be idly made since it is of insufficient length by itself to displace the portion 246 from the carrier to be loaded. Accordingly, the empty carrier is, by reason of the engagement of the pin 68 with its slot 70, moved down the tube 196 against the resistance of the spring 230 until the pin 68 exists from the lower end of the slot 220 whereupon the member 238, under the influence of the spring 230, acts via the latch portion 246 to return the empty carrier and any carriers then immediately above it back up the tube to await arrival of the next discap-bearing pocket 56. A protuberance 249 (FIGS. 10 and 13) in the tube 196 just above the loading zone helps to inhibit the carriers against excessive return motion. As a properly loaded carrier is moved downwardly in the delivery tube 196 by the pin 68, the spring finger 218 extends between the leads of the discap and yieldingly engages the lower portion of the loaded discap body to insure, during this critical period of transfer, that the body will not be tilted, but that it will assume a proper position in the carrier so that the leads can be positioned substantially against stops 250, 250 (only one shown in FIG. 11) respectively formed in each carrier and resting endwise on shelves 252, 252 also formed therein.

Figure 15:
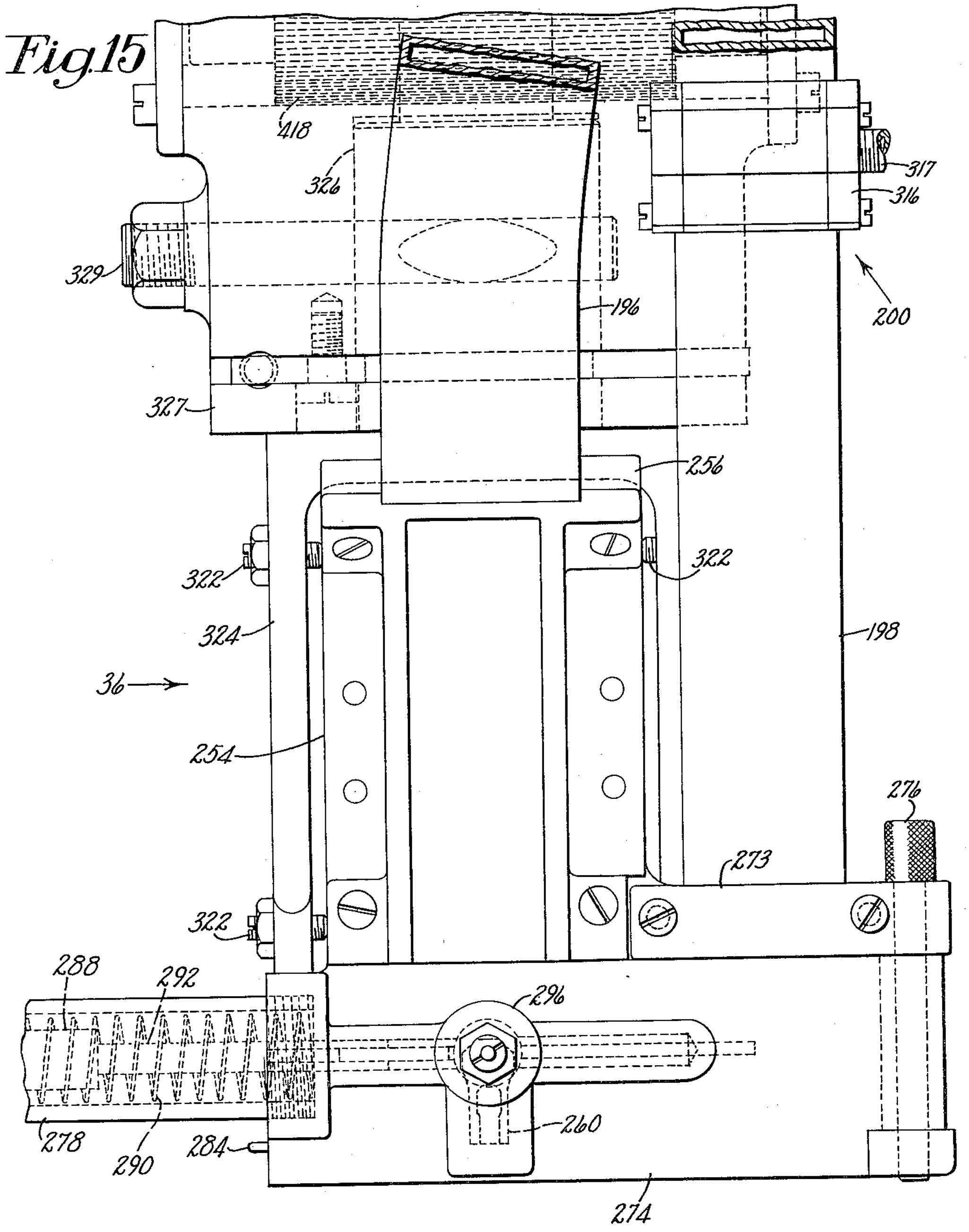
FIG. 15 is a front elevation of the lower portion of the inserting head of the machine.
Figures 16, 17:
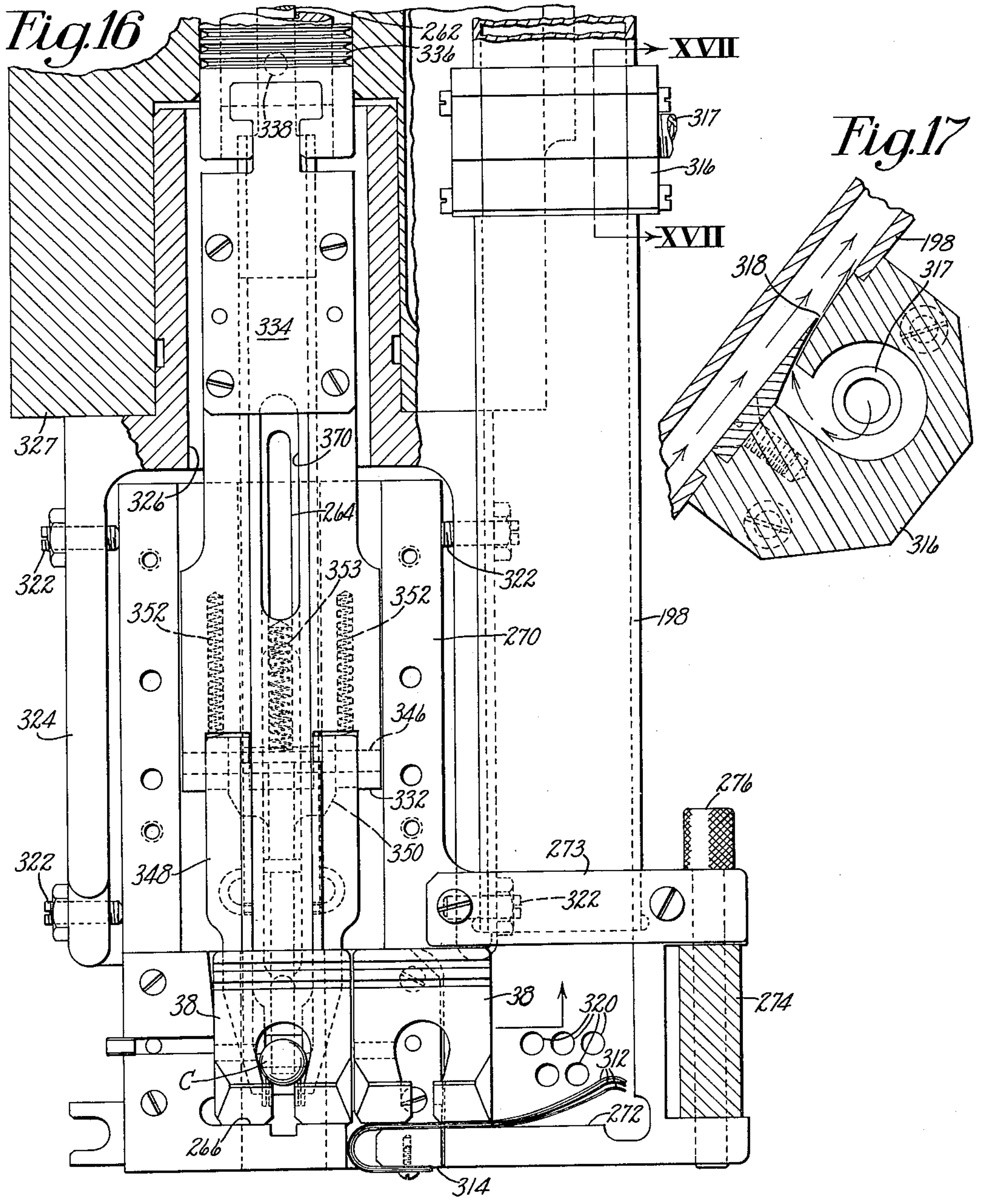
FIG. 16 is a front elevation of the inserting head in starting position and with the transfer and carrier delivery tube removed.
FIG. 17 is a vertical section on the line XVII—XVII of FIG. 16 showing air jet means for returning the unloaded carriers.
Figure 18:
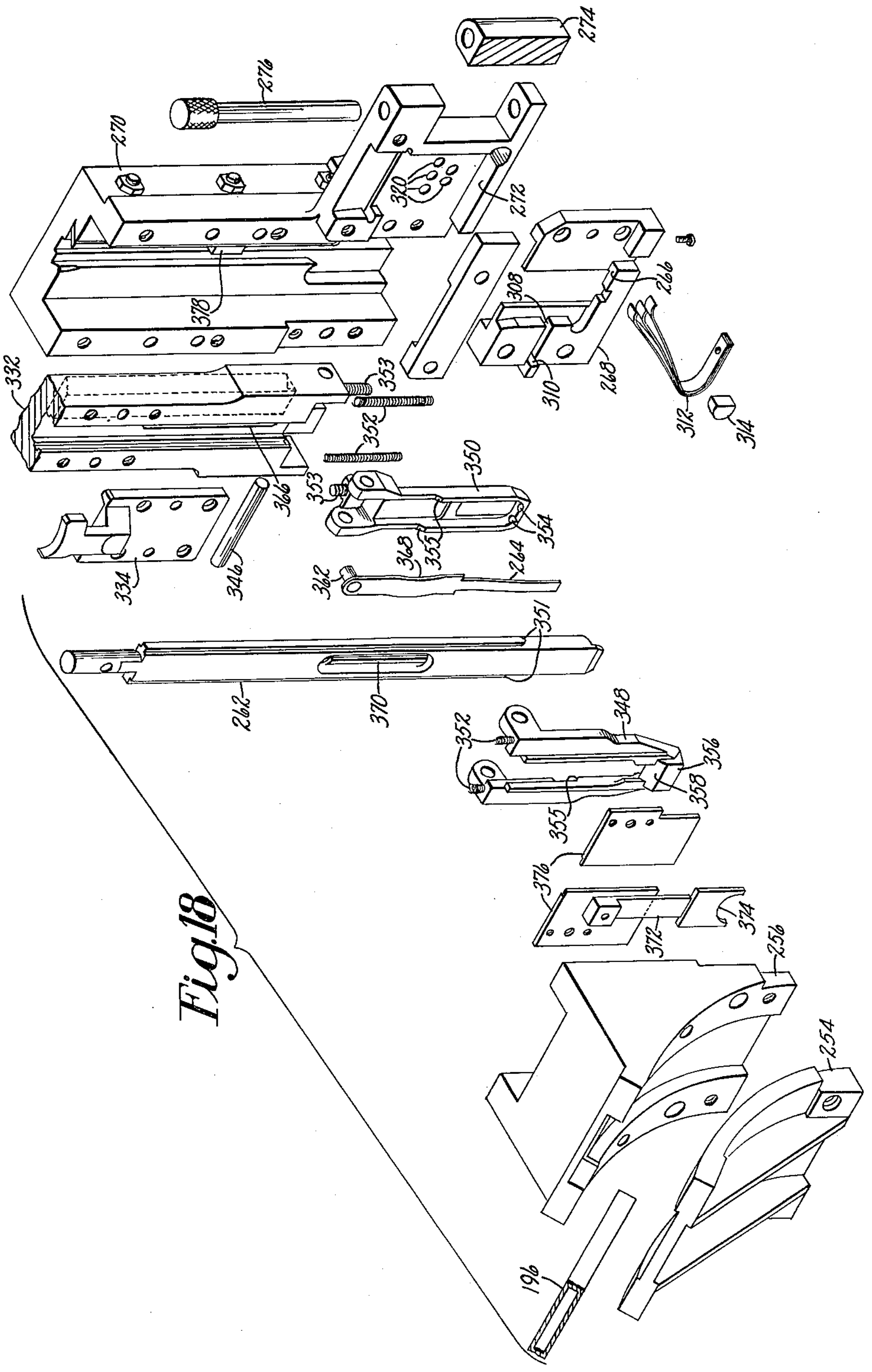
FIG. 18 is an exploded perspective of the operating parts comprising the inserting head.

The lower end of the tube 196 is disposed to deliver successive loaded carriers into an arcuate passageway of rectangular cross section formed by a suitably slotted adaptor 254 (FIG. 19) secured to a complemental block 256 of the inserting head 36 soon to be described. As noted in FIGS. 19 and 22, when the parts of the machine are in their starting positions in a cycle of operation, an endmost loaded carrier 38 has descended to deposit a discap on a slightly sloping ledge 258 of a feed plunger 260 (FIGS. 19 to 23 inclusive) and the preceding discap has previously been removed from its carrier to be held in the lower end of an inserter 262 (FIGS. 18–23) by means of a clip spring 264 mounted in the head as will be explained. FIGS. 16, 22 and 23 illustrate the contacting relation of horizontally alined carriers 38, a left-hand one of which is to be, or has been, relieved of its discap, the right-hand carriers having been successively shifted to the right, away from the operating path of the inserter and toward the return tube 198, by means about to be explained. The endmost loaded carrier 38, when in discap delivering position, straddles the just-mentioned plunger ledge 258 and slidably rests on a horizontal surface 266 of U-shaped piece 268 (FIGS. 16, 18 and 23) screwed to the lower end of a shroud guide block 270 included in the head 36. The surface 266 extends slidably to support the width of slightly more than one and one-half carriers and merges with a surface 272 of the block 270 constituting, in effect, the bottom of the tube 198. A strap 273 (FIGS. 15 and 16) secures the lower end of the tube 198 to the block 270. For retaining the carriers 38 in contacting alinement as they are being shifted from their delivery position to the tube 198 and for providing convenient access to the carriers and other operating parts, a closure or door 274 (FIGS. 19–23 inclusive) is swingably mounted on a hinge pin 276 extending through vertically alined bores formed in the block 270. The door 274 has a threaded connection at one end with a cylinder 278 and is normally held in closed position by a stud 280 which may be pivoted into clamping relation with an ear 282 on the block 270, a wing nut 284 on the stud then being tightened to lock the door during operation of the machine.

An end of the cylinder 278 is in communication with a hose 286 for supplying air under pressure as controlled by a solenoid valve S8 (FIGS. 1 and 24) of the electrical control system. Air is admitted via the hose 286 to the cylinder 278 to actuate a piston 288 (FIGS. 22 and 23) against the resistance of a return spring 290. A piston rod 292 threaded at one end into the piston 288 has its other end formed with a beveled cam 294 for effecting retraction of the plunger 260 in a cylindrical housing 296 integral with the door 274, the plunger normally being urged toward the inserter by a compression spring 298 seated in the housing 296. A pair of guide plates 297, 299 (FIGS. 19–23) secured to the housing 296 prevents rotation of the plunger 260 therein. The rod 292 is, in effect, a composite one in that it has a portion 300 (FIGS. 22 and 23) of reduced thickness defined by radial stops 302, 304 and a flat longitudinal surface therebetween for accommodating a portion of an angular slide rod 306. One end of the latter is arranged to slide in a horizontal slot 308 (FIGS. 16 and 18) formed in the piece 268 and is disposed to engage a side of the carrier resting on the surface 266. The distance between the stops 302, 304 is greater than the length of the rod 306 slidably engaging the portion 300 to provide an initial lost motion on the part of the piston 288 so far as the rod 306 is concerned, the stop 304 initially being caused to urge the latter to the left (as viewed in FIG. 22) and against a stop 310 formed on the piece 268. This lost motion is for the purpose of enabling the ledge 258 of the plunger 260 to be fully retracted by the cam 294 from within a carrier 38 which has just been unloaded before that carrier is shifted horizontally to the extent of its own width by the endwise movement of the slide rod 306 as effected by the stop 302 bearing thereon. The operating stroke of the slide rod 306 is terminated by the piston 288 abutting the door 274 (as shown in FIG. 23) after the unloaded carrier and its preceding carrier have thus been shifted. The preceding carrier accordingly is moved to the right (as viewed in FIGS. 16, 22 and 23) over a restrained end portion of a leaf spring 312 secured to the underside of the piece 268 and then onto the upwardly bent unsecured end portion of the spring 312 to depress it upon the surface 272. The spring 312 extends around the periphery of a semicircular insert 314 (FIGS. 16 and 18) permitted somewhat to float in a slot in the piece 268. The depressed free end of the spring 312 is therefore enabled to snap upwardly to impart rapid upward movement to the empty carrier as soon as it is alined with the passageway in the lower vertical end portion of the return tube 198. This spring action impels successive carriers sufficiently to bring them within pneumatic influence of an air jet emitter 316 (FIGS. 16 and 17) affixed on the tube 198 and having a transversely extending, upwardly directed slit-shaped orifice 318 the opening of which is of the order of .012". A stream of air under pressure delivered by a hose 317 to the emitter is discharged upwardly into the passageway of the tube 198 nearly tangential to the inner surface of the tube adjacent to and above the orifice, the air discharge being timed by a solenoid valve S7 (FIGS. 1 and 24) of the electrical control system. The solenoid valve S7 is actuated substantially concurrently with the solenoid valve S8. The arrangement is such that the air discharged through the orifice 318 draws multiple volumes of air upwardly from the lower end of the tube 198 and hence first pulls by suction on a carrier ascending the tube 198 and then the ascending air is applied to the underside of the carrier to blow it upwardly into engagement with the stop block 218 as aforementioned. Intake holes 320 (FIG. 16) are provided in the shroud guide block 270.

*Inserting head*

Figure 19:
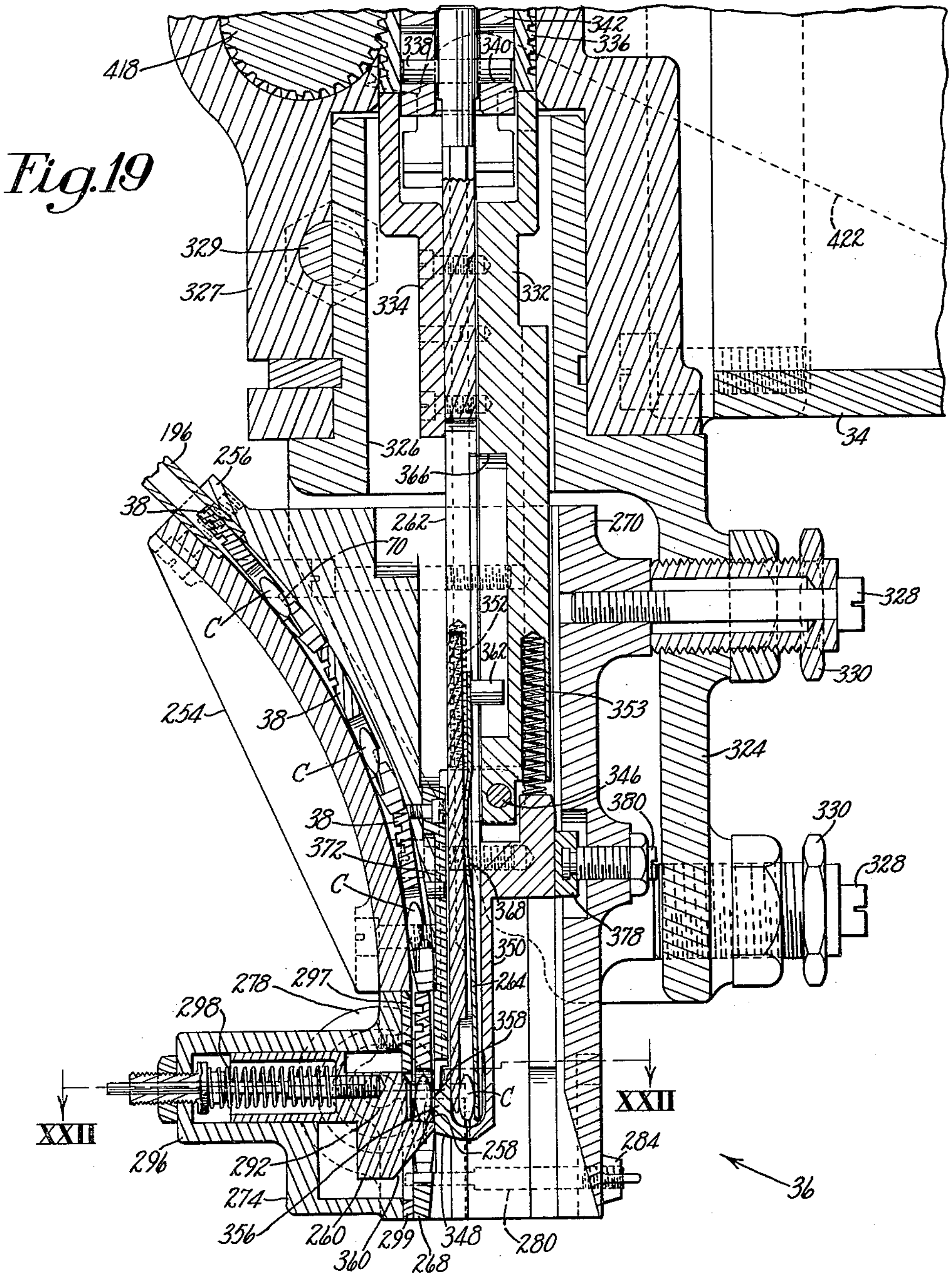
FIG. 19 is a vertical section illustrating the inserting head at its starting position.
Figure 20:
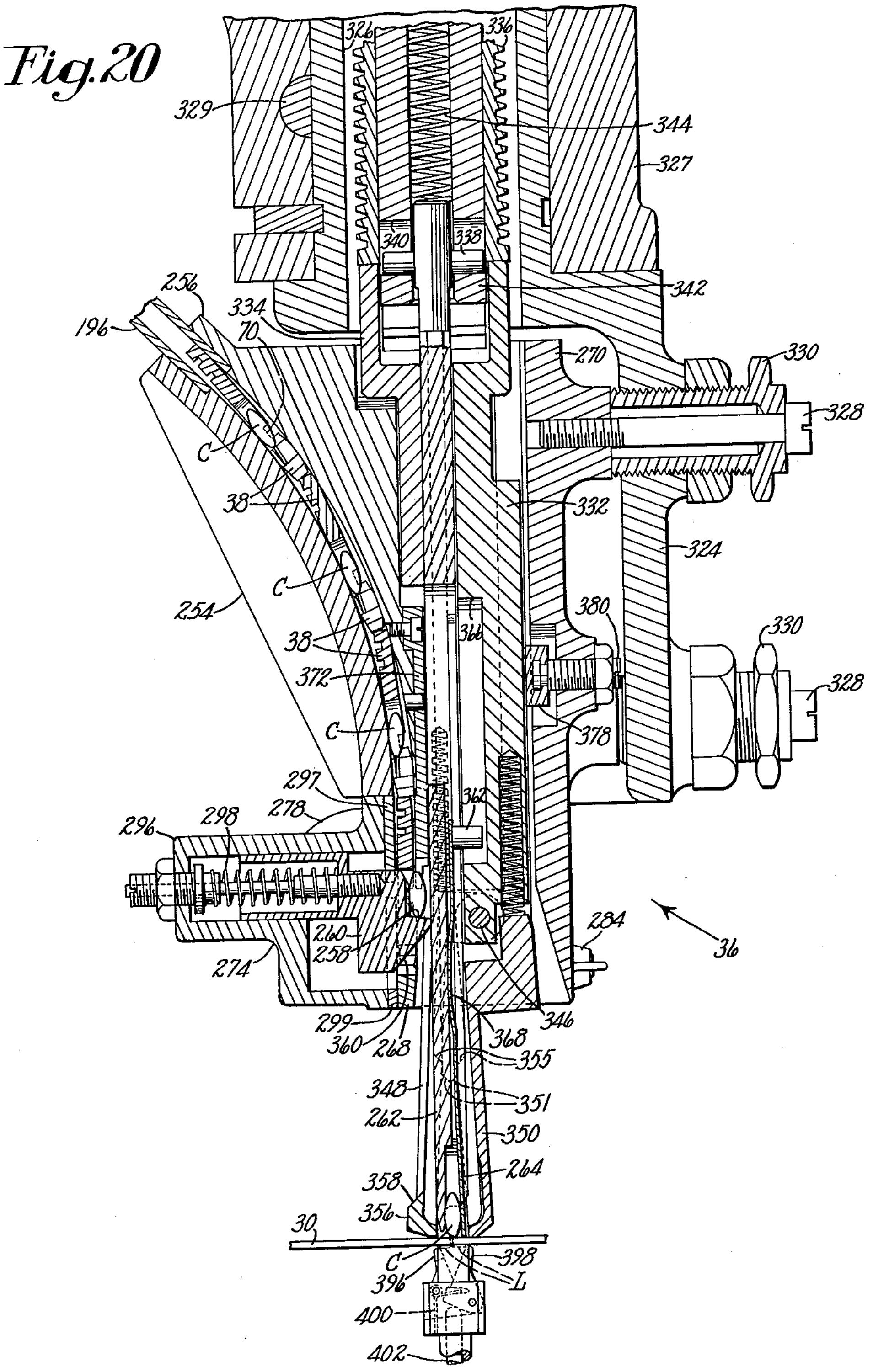
FIG. 20 is a view similar to FIG. 19 but showing the parts at their later stage in a cycle of operations when the leads of a discap have been inserted and clinched.

In some respects the inserting head 36 and its cycle, though now simplified in construction, resemble that disclosed in the above-cited Walsh application. It comprises the shroud guide block 270 positioned by four setscrews 322 (FIG. 16) with relation to a support 324 the upper end of which is formed as a sleeve bearing 326 rotatable in a casting 327 secured to the main frame 34. In order that the head 36 may be rotationally adjusted about a vertical axis extending through the inserting means and clamped in selected position, a bill binder 329 is threaded into the casting 327 for restraining engagement with the bearing 326. The hopper supporting bracket 46 accordingly is also rotatably mounted on the upper end of the casting 327 to enable the head 36 and the hopper 54 to be rotatably adjusted concurrently. Triangularly disposed studs 328 (two only shown in FIG. 19) threaded into the back of the block 270 extend freely through sleeves 330, respectively, that in turn threadedly extend through the support 324. Accordingly, the studs 328 serve as means for initially clamping the head 36 in operating position and the setscrews 322 provide a more refined positional adjusting means normally used thereafter. The rear inner wall of the block 270 is rabbeted vertically slidably to receive a shroud 332 (FIGS. 16 and 18–21). The shroud is U-shaped in cross section and formed at opposite inner sides with vertical guideways adapted slidably to receive the inserter 262. For slidably confining the inserter in the shroud a plate 334 is secured to the latter and formed with a T-shaped coupling that is connected to the lower end of a hollow, cylindrical shroud operating rack 336 (FIGS. 16, 19 and 20). This rack is vertically movable in a bore in the casting 327 by power means later described which are also provided for reciprocating the inserter heightwise in timed relation to the shroud 332. The inserter is accordingly bored to receive a coupling pin 338 (FIGS. 16, 19 and 20) extending in a vertically disposed slot 340 formed in a tubular extension 342 (FIGS. 19 and 20). Though not shown herein, the extension 342 is externally formed with circular rack teeth as disclosed in the mentioned Walsh application and is capped to confine a safety compression spring 344 bearing on the inserter normally to hold its pin 338 against the lower end of the slot 340.

The lower end of the shroud 332 carries a pin 346 (FIGS. 18 to 21) for pivotally supporting a pair of cooperative lead guides 348, 350 arranged respectively at opposite sides of the inserter. The front lead guide 348 is engaged by compression springs 352, seated in the shroud thus to urge semiconical lead receiving channels in the lower end of the front guide to close on corresponding semicircular lead receiving channels 354 (FIG. 18) formed in the rear guide 350. In like manner a spring 353 in the shroud urges the channels 354 into closed operating position. For pivoting the guides 348, 350 apart at an appropriate moment in the operating cycle, cams 351 on the inserter are disposed to engage a pair of cams 355, 355 on the respective guides. As shown in FIG. 19 a thickened stop portion 356 on the front guide 348 serves initially in a cycle to hold the plunger 260 retracted, and a cam surface 358 of the portion 356 is provided to cooperate, in the course of each up stroke of the shroud depicted in FIG. 21, with a bevel cam 360 on the plunger 260 thereby effecting a plunger retraction. In conjunction with FIGS. 16, 19 and 20 it should also be noted that the lower end portion of the inserter 262 is recessed to receive the body of each discap and bears on spaced upper portions of its perimeter, one side of the discap also being engageable by the inserter and the other side of the discap being yieldably engageable by the lower end of the vertically slidable clip spring 264. This clip spring is provided at its upper end with a projection 362 arranged to be received in a guide slot 366 formed in the shroud and has a slightly bent mid-portion 368 adapted frictionally to engage the inserter and thus be urged heightwise by corresponding movement of the inserter. A vertical slot 370 (FIG. 18) in the inserter is provided to enable the clip spring 264 to be inserted through the inserter on being assembled in the machine.

Figure 21:
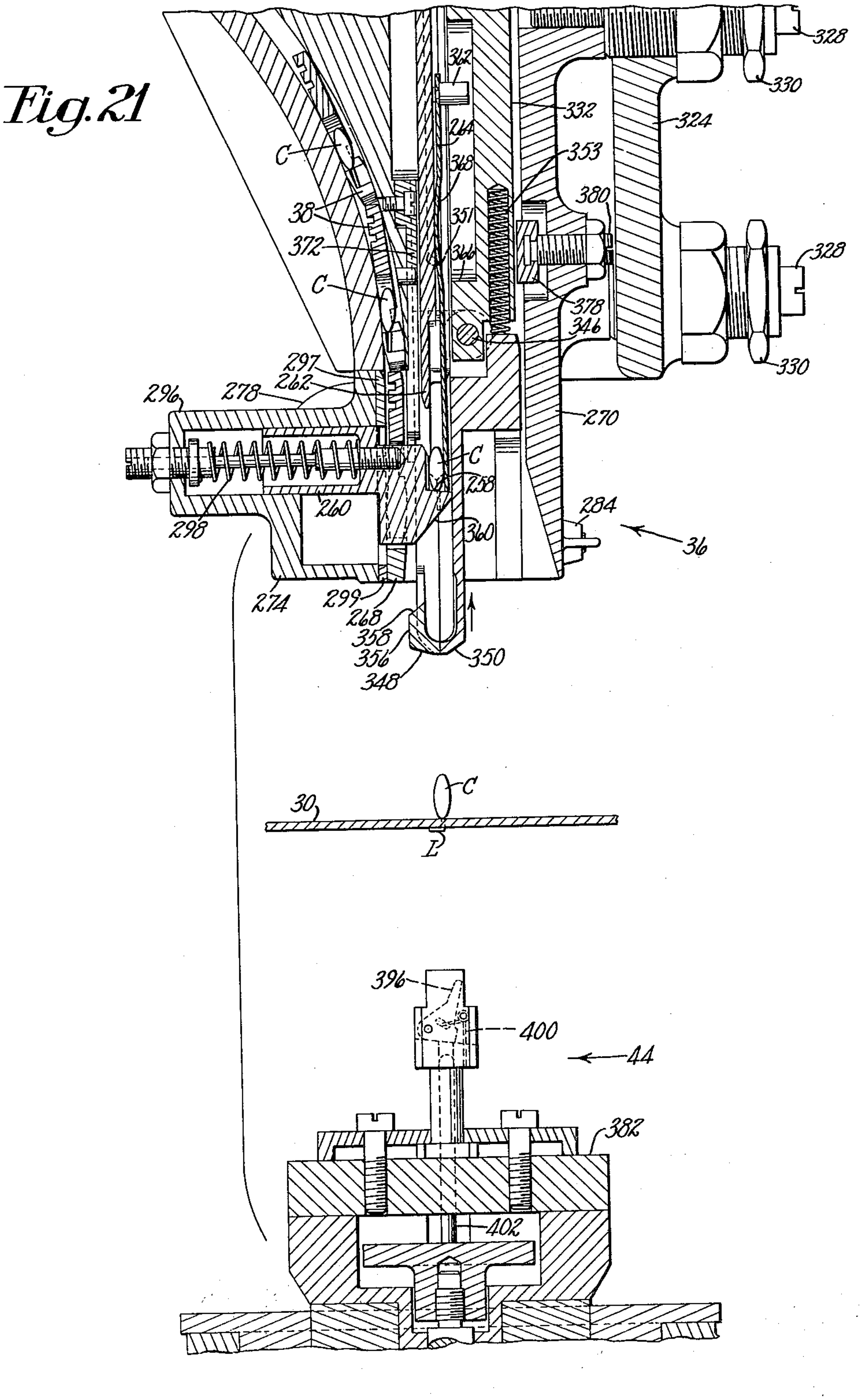
FIG. 21 is similar to FIGS. 19 and 20 but showing the clinching anvil and operating parts of the head as they return to their starting positions.
Figures 22, 23:
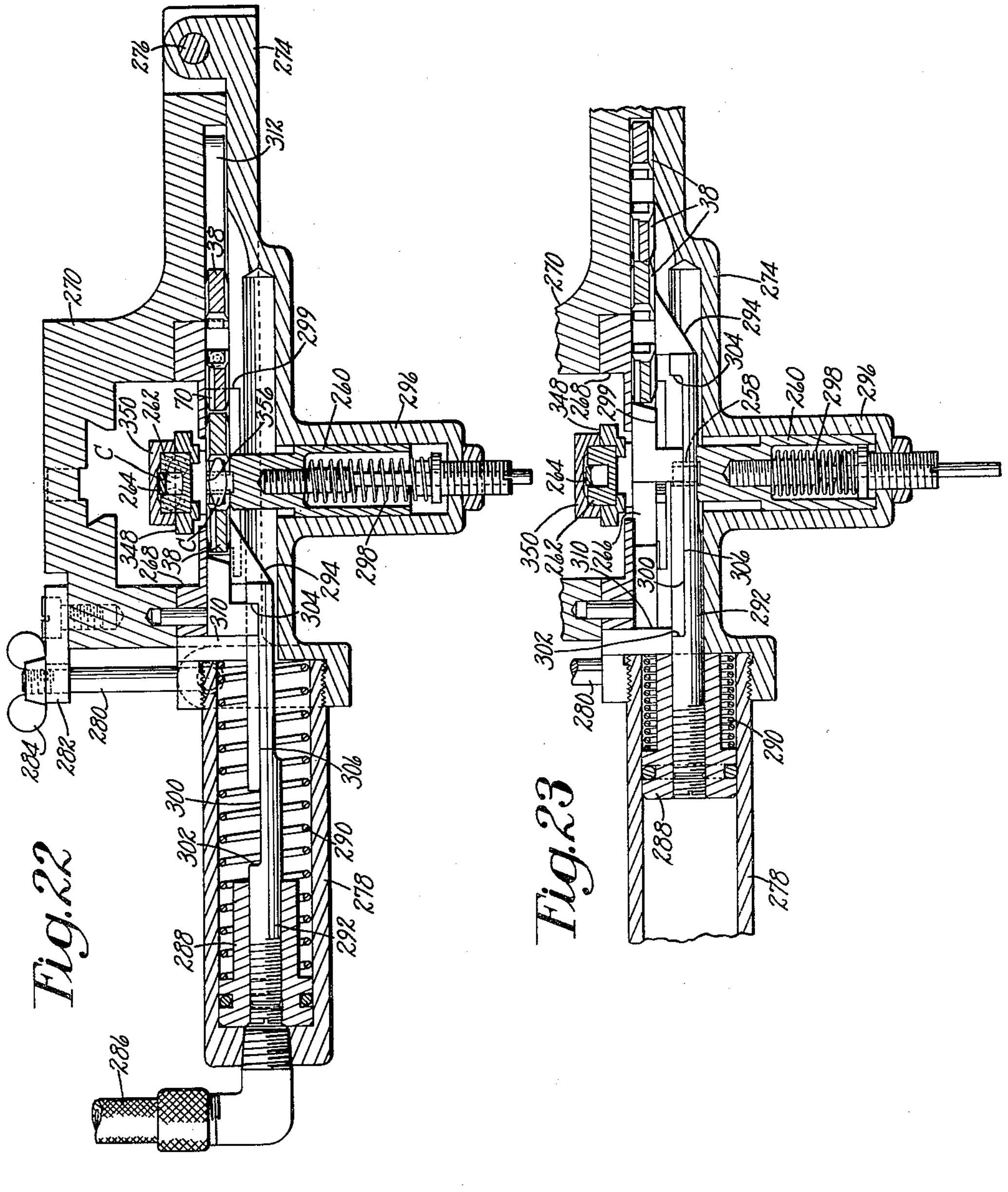
FIG. 22 is a section taken on the line XXII—XXII of FIG. 19 and showing a shelf plunger about to transfer a discap from a carrier to the inserter.
FIG. 23 is a view similar to FIG. 22 but at a later stage when the shelf plunger has been retracted and the unloaded carrier advanced.

For restraining the body of the discap on the retracted ledge 258 against tipping and thus better insuring proper positioning of the discap when carried by the plunger 260 beneath the inserter and against the clip spring 264 (as shown in FIG. 21), a member 372 (FIGS. 18–21) secured to the block 256 has a depending portion provided with a semi-circular passageway 374. A pair of hardened complemental spacer plates 376 (FIG. 18) respectively receive a screw and a pair of dowel pins which extend through the block 254 and the block 270. In order to brace the lead guides 348, 350 against pivotal movement counterclockwise (as viewed in FIG. 19) in the course of their upward movement to envelop the discap next to be inserted, as a consequence of force exerted by the spring-pressed plunger 260, an abutment 378 is adjustably mounted on an end of a setscrew 380 threaded into the block 270.

*Clinching mechanism*

Figure 24:
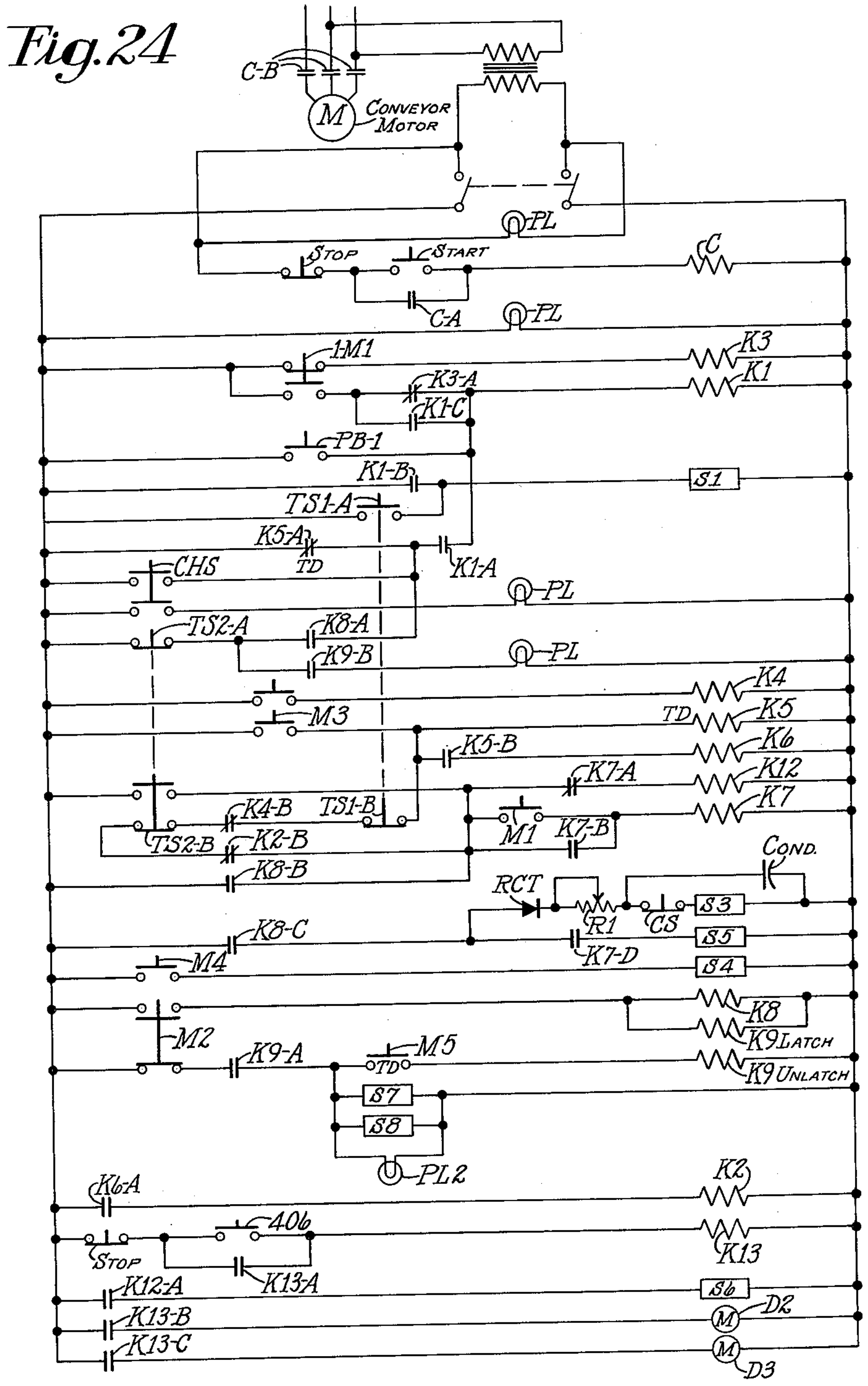
FIG. 24 is a schematic wiring diagram of the illustrative machine as employed in an automatic, conveyorized assembly system.

Since the lead clinching mechanism 44 (FIGS. 1, 20 and 21) shown herein is essentially like that disclosed in a copending application Serial No. 640,010, filed February 13, 1957 in the names of William Stolecki et al. and operates much in the same manner, it will suffice for present purposes to describe the mechanism only briefly. For mechanically raising an anvil support 382 (FIG. 1) in the base of the frame 34, as well as for operating other parts at the appropriate time in the cycle of the machine, a main drive shaft 384 having bearing in the upper portion of the frame is coupled by conventional electric clutch mechanism to a continuously rotated sprocket 385 (FIG. 1) mounted on the shaft 384. The main shaft carries a cam (not shown) cooperative with a roller 386 borne by the upper end of an arm 388 pivoted to the frame. The arm is arranged to actuate the support 382 by connecting linkage consisting of a link 389, a bell crank 390, a link 392, and a bell crank 394. When the support 382 is thus raised in the locality of the wiring board 30 through which the inserter 262 has thrust leads L, offset anvils 396, 398 (FIG. 20) pivotally mounted in the support are swung on their pivots to clamp the leads by wiping their protruding ends in opposite directions. To effect this wiping movement against the resistance of return springs 400, 400 (FIGS. 20 and 21), a piston 402 is arranged to engage the anvils and is reciprocable in a chamber in the support 382, which chamber is in communication with a hose 404 (FIG. 1) for supplying air under pressure as controlled by a solenoid valve S5 (FIGS. 1 and 24).

*Drive mechanism and controls therefor*

Assuming the machine to be in the energized conveyor-control system above-mentioned and shown herein (in deenergized condition in FIG. 24), a starting switch 406 of the machine is momentarily closed to energize a coil K13 thus closing contacts K13–A, K13–B, and K13–C. The coil K13 is held energized by the now closed contact K13–A, and the hopper separating and positioning motor D2 is now energized through the contacts K13–B, while a main drive motor D3 (FIGS. 1 and 24) is energized through the closed contact K13–C. The continuously driven sprocket 385 is operated by an endless chain 408 (FIG. 1) powered by the reduction geared motor D3. For performing a cycle of operations the shaft 384 is coupled by energization of a D.C. clutch coil S3 (FIGS. 1 and 24) to the sprocket. The energizing of the clutch coil S3 to engage the clutch thus to rotate the main shaft occurs due to certain intermediate steps now to be explained. In the automatic pallet conveyor control system a switch M3 (FIG. 24) is closed as a consequence of all of the board-carrying pallets being clamped in their respective conveyor stations, for instance to receive components. By thus closing the switch M3, a relay coil K12 is energized through a closed conveyor circuit including the switch M3, a switch TS1–B, a normally closed contact K4–B, a switch TS2–B, and normally closed contacts K2–B and K7–A. Hence a contact K12–A is closed to energize a solenoid valve S6 (FIGS. 1 and 24).

Resultant movement of a plunger 410 (FIG. 1) of the solenoid valve S6 actuates a frame-supported bell crank 412 one arm of which accordingly shifts a spring-pressed slide 414 (to the right as viewed in FIG. 1) to unlatch a clutch plate 416 and similarly shifts a cross arm 417 of the slide to allow a dual position switch M2 (FIGS. 1 and 24) to be shifted to a closed position for thus energizing a relay coil K8 (FIG. 24) and the latching coil of a memory relay K9. Contacts K8–A, K8–B, K8–C, K9–A, and K9–B are thereby closed, the solenoid S3 then being energized through a circuit including the contact K8–C, a rectifier RTC, a resistor R1, and a clutch switch CS. A condenser connected across the D.C. clutch coil S3 is used to increase and smooth out the D.C. voltage.

With the plate 416 unlatched and the solenoid valve S3 energized the main shaft 384 is rotated to effect a complete cycle of operations in each rotation, the air blast switch M4 concurrently being mechanically opened and closed alternately to energize and de-energize the air blast solenoid valve S4. For actuating the inserter 262 and the shroud 332 heightwise in the head 36 in proper time relation, mechanism now to be described is provided. The shroud operating rack 336 (FIGS. 15 and 16) is arranged to mesh with a pinion gear 418 (FIGS. 1 and 19) having bearings in the casting 327, and the gear 418 is in mesh with a segmental gear 420 (FIG. 1) formed on one end of a lever 422 pivotally supported at 424 in the frame 34. The other end of the lever 422 carries a roll 426 arranged to be received in a closed cam slot (not shown) in the clutch plate 416. In similar manner the aforementioned rack teeth on the inserter extension 342 are disposed to mesh with a pinion 430 (FIG. 1) which is also in mesh with a segmental gear 432 formed on one end of a bell crank lever 434 pivoted at 436 in the frame 34. The other end of the lever 434 carries a roll 438 disposed in an inserter-controlling cam slot (not shown) in the plate 416.

Next in the electrical sequence of operations, the inserter 262 having moved down to effect lead insertion (as shown in FIG. 20), a cam 440 (FIG. 1) on the shaft 384 actuates a wiper timing switch M1 (FIGS. 1 and 24). As a result a relay coil K7 is energized through the previously closed contact K8–B. Thereupon the contact K7–A opens and contacts K7–B and K7–D close, the coil K7 then being held energized through the closed contacts K7–B and K8–B. The relay coil K12 is now de-energized by the opening of the contact K7–A, and hence the contact K12–A is reopened to de-energize the solenoids S6 and allow the slide 414 to latch with the clutch plate 416 upon completion of a revolution to end a cycle. The closure of the contacts K8–C and K7–D completed a circuit energizing the solenoid valve S5 thereby causing air under pressure to be delivered through the hose 404 whereby the protruding leads are clinched by the anvils 396, 398.

A relay coil K2 of the conveyor control circuit is energized through the previously closed contact K6–A (closed by the energizing of a relay coil K6 when a contact K5–B had been closed by an energized relay coil K5). The contact K2–B is accordingly now opened. The inserter 262 returns to its initial raised position at which time the clutch control switch M2 opens (i.e. is no longer actuated by the cross arm 417) to de-energize the coil K8 and latching coil of the relay K9. The contacts K8–A, K8–B, and K8–C now reopen and hence the relay K7 is de-energized to cause the contact K7–A to reclose and the contacts K7–B and K7–D to open. The reopened contact K8–C de-energizes the clutch coil S3 and the solenoid valve S5.

When the clutch control switch M2 opened the above-described circuit, it also closed a circuit through the previously closed contact K9–A energizing the solenoid valves S7 and S8 and thus effecting delivery of air under pressure for returning or recirculating empty carriers 38. Accordingly, one carrier is moved from its unloading or inserting position and thereby displaces the preceding empty carrier which is thereupon forced upwardly by pneumatic suction and pressure (after being assisted by the spring 312) through the return tube 198, to close the carrier return air control switch M5. A circuit through the closed side of the switch M2 thereby energizes an unlatch coil (FIG. 24) of memory relay K9. The contacts K9–A and K9–B are thereupon opened to de-energize the solenoid valves S7 and S8, indicating light PL2, and the unlatch coil of memory relay K9. As a consequence the carrier return air control switch M5 times out and opens to release the empty carrier for redelivery under the influence of gravity to the stack of carriers awaiting loading.

The control circuits are now restored to initial condition. If for some reason the inserter 262 fails to return to its initial position the switch M2 will remain closed keeping relay coil K8 energized. The contacts K8–A, K8–B and K8–C will remain closed. A clamp control relay K1 of the automatic pallet conveyor control circuit will remain energized through a switch TS2–A and the closed contact K8–A thus retaining the conveyor pallets 30 in their clamped positions. The indicating light PL will remain energized through the closed contact K8–B. If for some reason a carrier 38 fails to actuate and close the time delay return air control switch M5, the unlatch coil of memory relay K9 will not become energized and the contacts K9–A and K9–B would remain closed. Accordingly, the solenoid valves S7 and S8 and the indicating light PL2 would remain energized through the switch M2 and the closed contact K9–A. The pallet clamping control relay K1 of the conveyor control circuit would remain energized through the switch TS2–A and the closed contact K9–B, holding the conveyor pallets 30 in clamped condition.

*Résumé of operating cycle*

In general, operating parts of the head 36 are actuated in time relation not differing substantially from the cycle fully disclosed in the charts of the above cited Walsh application. But in the present instance carrier-borne components are caused individually to be prepositioned on the feeding plunger and hence, despite dimensional irregularity in discaps, delivered into uniform position to be operated upon by the head. Further by way of distinction, the machine herein disclosed operates as a unit continuously retaining control of the discaps to load them in the successively positioned carriers 38, to unload them and to mount the discaps, and thereafter to recirculate and reload the carriers without need for operator attention except to keep the hopper 54 supplied with components to be mounted.

Operating experience has indicated that the discap segregating and positioning plate 52 of the carrier loading mechanism 40 may advantageously be rotated at slower speed and more effectively than comparable devices heretofore known while providing loaded carriers 38 at a rate entirely adequate to meet the needs of the head 36. As has been noted, a reservoir of carriers 38, preferably about four in number, is awaiting unloading and several empty carriers 38, perhaps of the order of three or four (including one or two in the tube 198) awaiting loading may be in the carrier circulating system. It is of course desirable that the total number of carriers be adequate to insure that an empty carrier will be in position to receive a discap each time that a station 62 rotates into position to thrust its detector pin 68 into the slot 70 of the empty carrier about to be loaded. As has been explained the machine is so constructed that no empty carrier can be delivered to the head 36 and no discap may be thus delivered without a carrier; only uniformly and accurately positioned discaps accordingly are presented, one at a time, by their carriers to the plunger ledge 258 which, along with the plunger proper, enters the carrier recess 222 between the shelves 252 to transfer the discap from the carrier. The inserter 262 is thus unfailingly supplied with discaps to be mounted.

FIGS. 19 through 21 illustrate successive stages in an operating cycle of the head 36. The ledge 258, when fully advanced to its discap presenting position and just prior to occupying its position depicted in FIG. 21, had engaged the clip spring 264. The then ascending inserter 262, by reason of its frictional engagement with the spring 264, acts to lift the lower end of the latter until it rests on the ledge 258 as shown in FIG. 21. The inserter then descends, its reduced lower end cooperating with a beveled upper edge of the plunger and entering wedge-like between it and the discap body. The lower end of the inserter pauses to dwell just short of engagement with the ledge. The lead guides 348, 350 then further ascend to enclose the body of the discap next to be mounted and to confine its leads to the now closed conical channels 354. When so ascending, as has been noted, the plunger ledge is retracted from beneath the discap body and also cleared from the paths of the inserter and the lead guide 348, by the engagement of the cam 358, with the cam 360. The inserter 262, the clip spring 264 and the lead guides now fully descend together with the discap, as is shown in FIG. 20, the last portion of the downstroke of the inserter thrusting the leads through the board 30 and the lead guides being cammed apart by the cooperating cams 351, 355. The guides then bear on the board to brace it against lead clinching action. After clinching of the leads the inserter 262 is returned to its starting position causing the switch M2 to open and deenergizing the clutch coil S3 and the solenoid valve S5.

To cause complete withdrawal of the ledge 258 from the now empty recess 222 of the carrier in unloading position, thus to clear the way for lateral shifting of two side-by-side carriers by operation of the slide rod 306, the cam 294 engages the plunger fully to retract it, the solenoid valve S8 being energized upon return of the inserter and opening of the switch M2 to admit air under pressure first to actuate the piston rod 292 and then to actuate the slide rod 306. As has been explained above the solenoid valve S7 is concurrently energized pneumatically to effect return of the preceding empty carrier 38 that is forced by the spring 312 upwardly in the tube 198. The blown carrier momentarily contacts and closes the time delay carrier return air control switch M5 thus energizing the unlatched coil of the memory relay K9 through the closed side of the clutch control switch M2 and the closed contact K9–A. The contacts K9–A and K9–B accordingly open, de-energizing the solenoid valves S7 and S8, the coil of the memory relay K9, and the indicating light PL2. The de-energized valve S8 permits the spring 290 to return the slide rod 306 against the stop 310 so that the next carrier 38 may descend onto the ledge 258. As soon as the return air control switch M5 times out and opens, all circuits are reset for a new operating cycle. It will thus be seen that the invention provides a highly dependable machine in which the rate of component insertion controls the rate at which carriers are unloaded at the head 36 and made available for reloading adjacent to the plate 52.

Having thus described our invention, what we claim as new and desire to secure by Letters Patent of the United States is:

1. In a machine for mounting components and having an inserter movable toward and from a work piece, the combination of a plurality of carriers respectively formed releasably to hold a component, guide means for conducting successive carriers from a loading zone to an unloading zone adjacent to the path of the inserter and return, an ejector mounted on said guide means on the return side of said unloading zone, means operable intermittently to advance an empty carrier in said guide means away from the unloading zone and into position to be partly returned by the ejector, and pneumatic means in communication with the guide means for completing the return of the empty carrier to the loading zone, said intermittent carrier advancing means being operable in time relation to the inserter.

2. The combination as set forth in claim 1, and further characterized in that said pneumatic means comprises an inlet slit in the guide means and mechanism operative in time relation to the inserter for directing an air jet through the slit and adjacent to an internal wall of the guide means for sequentially effecting suctional and pushing effect on each carrier thus being returned.

3. In a machine for mounting components and having an inserter movable toward and from a work piece, the combination of a frame, a plurality of independent carriers respectively formed releasably to hold a component to be mounted by the inserter in the work piece, guide means on the frame for circulating the carriers successively from their zone of loading and through a straight portion adjacent to the path of the inserter, said straight portion including a carrier unloading zone, means movably mounted on the frame for transferring components from successive carriers in the unloading zone to the path of the inserter, and fluid pressure operated means mounted on the frame and including a piston rod operable in said straight portion alternately with the component transferring means to return unloaded carriers toward the loading zone.

4. The combination as set forth in claim 3, and further characterized in that said component transferring means comprises a plunger yieldingly urged toward the paths of the carriers and of the inserter, and said piston rod is arranged and adapted in the course of its operating stroke to engage the plunger and effect its retraction from said paths.

5. A machine for mounting components comprising a plurality of circulating carriers for respectively delivering the components to be mounted, a hopper for holding a random supply of components, means adjacent to the hopper for predeterminedly positioning successive components from its supply, said component positioning means comprising a series of stations respectively having carrier indexing means movable in a closed path substantially contiguous to the path of the carriers while empty, means for guiding carriers successively from the proximate vicinity of the component positioning means to the proximate vicinity of a work piece for receiving the components, loading mechanism for thrusting each component, when positioned, from the positioning means directly into a carrier as the latter is being fed in the guiding means, and means disposed in the carrier guiding means for positioning successive empty carriers therein until loaded by operation of the loading mechanism in the course of cooperation of the carriers with said indexing means.

6. A machine as set forth in claim 5 and further characterized in that said carrier positioning means includes a latch yieldably connected by a spring to the carrier guiding means, and the cooperative relation of the indexing means with the carriers is that of a pin and a slot slidably receiving said pin.

7. The combination as set forth in claim 5 and further characterized in that each of said stations further includes means operative, in the event no carrier is available to be indexed therewith, to retain a positioned component therein until it can be transferred to an empty carrier by the loading mechanism.

References Cited in the file of this patent

UNITED STATES PATENTS

| | | |
|---|---|---|
| 2,550,920 | Gilbert | May 1, 1951 |
| 2,778,478 | Brook | Jan. 22, 1957 |